United States Patent
Ishinaga et al.

(10) Patent No.: US 6,663,237 B2
(45) Date of Patent: Dec. 16, 2003

(54) INK JET RECORDING METHOD, RECORDING UNIT AND INK JET RECORDING APPARATUS

(75) Inventors: Hiroyuki Ishinaga, Tokyo (JP); Shinya Mishina, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/942,580

(22) Filed: Aug. 31, 2001

(65) Prior Publication Data

US 2002/0054195 A1 May 9, 2002

(30) Foreign Application Priority Data

Sep. 4, 2000 (JP) .......................... 2000-267797

(51) Int. Cl.⁷ ............................ G01D 11/00; C09D 11/00
(52) U.S. Cl. .................................... 347/100; 106/31.13
(58) Field of Search ...................... 347/100; 106/31.27, 106/31.6, 31.13

(56) References Cited

U.S. PATENT DOCUMENTS

| 5,184,148 A | 2/1993 | Suga et al. ................. 346/1.1 |
| 5,571,311 A | 11/1996 | Belmont et al. |
| 5,609,671 A | 3/1997 | Nagasawa |
| 5,746,818 A | 5/1998 | Yatake ...................... 106/31.86 |
| 6,221,141 B1 | 4/2001 | Takada et al. ............. 106/31.6 |
| 6,280,513 B1 | 8/2001 | Osumi et al. .............. 106/31.6 |

FOREIGN PATENT DOCUMENTS

| EP | 721841 | * 12/1996 |
| EP | 0 842 994 A1 | 5/1998 |
| EP | 0 943 666 A3 | 9/1999 |
| EP | 0 943 666 A2 | 9/1999 |
| EP | 0 976 561 A2 | 2/2000 |
| EP | 0 982 136 A2 | 3/2000 |
| EP | 0 997 288 A2 | 5/2000 |
| JP | 3-134073 A | 6/1991 |
| JP | 3-210373 A | 9/1991 |
| JP | 8-3498 A | 1/1996 |
| JP | 10-95941 | 4/1998 |
| JP | 10-510862 A | 10/1998 |
| JP | 2000-62180 A | 2/2000 |
| JP | 2000-62181 A | 2/2000 |
| JP | 2000-62182 A | 2/2000 |
| WO | WO 96/18695 | 6/1996 |

* cited by examiner

Primary Examiner—Stephen D. Meier
Assistant Examiner—Michael S Brooke
(74) Attorney, Agent, or Firm—Fitzpatrick, Cella, Harper & Scinto

(57) ABSTRACT

An ink jet recording method having steps of giving energy to ink, discharging the ink from a recording head and depositing the ink on a recording medium is provided. The ink contains a coloring material including at least self-dispersing carbon blacks and an aqueous medium and has potassium ions of 0.6% or more in a mass ratio with respect to the carbon blacks. The recording head includes a structural unit for discharging liquid droplets having a heating element for generating thermal energy for generating a bubble in a liquid; a discharge port for discharging the liquid; a liquid flow path communicating to the discharge port and having a bubble generation area; and a movable member to be displaced following growth of the bubble, and the ink is supplied to the liquid flow path and discharged from the discharge port by thermal energy from the heating element.

45 Claims, 11 Drawing Sheets

INK JET RECORDING METHOD, RECORDING UNIT AND INK JET RECORDING APPARATUS

BACKGROUND OF THE INVENTION

1. Field of the Invention

The present invention relates to an ink jet recording method, a recording unit, an ink jet recording apparatus and the like.

2. Related Background Art

Conventionally, ink for writing implements (fountain pens, nylon-tip pens, water ball-point pens, etc.) and ink for ink jet, which use carbon black high in print density and excellent in solidness or the like as a black coloring agent for printing ink, have been reported in various compositions. Among them, in recent years, detailed research and development have been carried out on compositions and physical properties of carbon blacks themselves, compositions and physical properties of ink containing the carbon black, and the like such that recording can be made satisfactorily on plain paper such as copy paper, reporting paper, notebook paper, writing paper, bond paper and continuous slip paper that are generally used in offices.

For example, ink that uses acid carbon black and alkaline soluble polymer is described in Japanese Patent Application Laid-open No. 3-210373. In addition, ink for ink jet with which dispersion excellent in preservation stability and dischargeability in a bubble jet recording apparatus tends to be realized is described in Japanese Patent Application Laid-open No. 3-134073.

In addition, Japanese Patent Application Laid-open No. 8-3498 presents technical problems such that ink containing a dispersing agent together with carbon black is unstable in discharge as ink for ink jet and cannot realize a sufficient print density, and discloses ink using self-dispersing carbon blacks that can disperse in a solvent without using a dispersing agent as ink capable of solving the problems. International Patent Publication No. 96/18695 (Japanese Patent Application Laid-open No. 10-510862) and U.S. Pat. No. 5,746,818 (Japanese Patent Application Laid-open No. 10-95941) also disclose ink for ink jet containing self-dispersing carbon blacks and describe that high quality images can be obtained using the ink.

Moreover, in European Patent Publication No. EP943666, inventors of the present invention disclose technical means for adding salt to ink in addition to the above-mentioned self-dispersing carbon blacks for the purposes of improving paper type dependency of an image density, reducing bleeding in a boundary between black and color, and the like in using the above-mentioned self-dispersing carbon black as ink for ink jet.

Incidentally, concerning conventional pigment ink, it is known that discharge stability may be lost. More specifically, for example, when ink is discharged from a predetermined nozzle of an ink jet recording head and then the ink is discharged again from the nozzle after the discharge of the ink from the nozzle is stopped for a certain length of time (e.g., 12 hours), the re-discharge of the ink may not be stable, whereby printing is collapsed (operations for discharging ink from a predetermined nozzle and discharging the ink again from the nozzle after stopping the discharge of the ink from the nozzle for a predetermined length of time is hereinafter referred to as "intermittent discharge of ink" and a state in which re-discharge of ink is unstable is hereinafter referred to as "poor in intermittent dischargeability").

In addition, when ink is discharged again from a nozzle after discharge of the ink from the nozzle is stopped for a long time of period (e.g., a few days or more), a recovery operation for removing ink having increased viscosity or solidified in the nozzle may be required (a state in which re-discharge of ink is unstable due to increase in viscosity or solidification of ink in a nozzle is hereinafter referred to as "locking of ink" and a state in which a recovery operation is required many times for realizing stable re-discharge is hereinafter referred to as "poor in retentivity").

As described above, properties required of black ink for ink jet need to be extremely sophisticated in accordance with the need for images recorded by ink jet to be very high in quality in recent years. However, concerning pigment ink containing the above-mentioned self-dispersing carbon black as a coloring material, it cannot be said that technical knowledge for giving a high OD and a sharp edge and attaining excellent ink jet discharge properties such as intermittent dischargeability and retentivity is sufficiently attained. Thus, some of the characteristics of such pigment ink as ink for ink jet recording are unclear.

On the other hand, various improvements have been made on a configuration of an ink jet recording head. A configuration in which a movable member for regulating a flow of liquid (ink) and a growing direction of a bubble is provided in a bubble generation area in a liquid flow path is disclosed, for example, in Japanese Patent Application Laid-open Nos. 2000-62180, 2000-62181 and 2000-62182.

For example, the above-mentioned ink containing self-dispersing carbon blacks and salt disclosed by the inventors of the present invention is extremely effective for reducing paper type dependency of an image density and reducing bleeding in a boundary area between black and color in an image, which is an initial object. However, as a result of further study aiming at establishing a more excellent ink jet recording technology by the inventors of the present invention, large fluctuations are sometimes found in the intermittent dischargeability and the retentivity of the ink depending on a structure of a recording head used.

On the other hand, in an ink jet recording head having the configuration in which a movable member is provided in a liquid flow path, a changing rate of a changing point from growth to contraction of a bubble in the liquid flow path is stabilized and quick separation of liquid being ejected is satisfactory and stabilized, whereby the printing grade can be improved. However, with ink using self-dispersing pigment, the pigment is deposited on such a movable member due to agitation or the like of liquid by the movement of the movable member, and the initial stability in the movement of the movable member cannot be secured as the amount of deposition increases, whereby dischargeability may be changed.

SUMMARY OF THE INVENTION

Now that a structure of a recording head is expected to be diversified in accordance with wide product development of ink jet printers and expansion of areas in which ink jet recording technology is to be applied in the future, it has been recognized that development is required for ink showing a satisfactory and stable ink jet property with respect to the diversification of recording heads while making use of excellent properties of ink containing self-dispersing carbon blacks.

The present invention has been devised in view of the above-mentioned drawbacks, and it is an object of the present invention to provide an ink jet recording method, a recording unit and an ink jet recording apparatus that have excellent properties as regards the intermittent dischargeability and the retentivity of ink.

In addition, it is another object of the present invention to provide an ink jet recording method, a recording unit, an ink jet recording apparatus and the like that can steadily obtain high quality prints.

An ink jet recording method in accordance with the present invention is an ink jet recording method having steps of giving energy to ink, discharging the ink from a recording head and depositing the ink on a recording medium, which is characterized in that;

the ink is ink containing a coloring material including at least self-dispersing carbon blacks, which are formed of at least one hydrophilic group bonded to a surface of a carbon black directly or via another atom group, and an aqueous medium and further having potassium ions of 0.6% or more in a mass ratio with respect to the carbon blacks; and the recording head includes a structural unit for discharging liquid droplets having a heating element for generating thermal energy for generating a bubble in liquid; a discharge port that is a portion for discharging the liquid; a liquid flow path communicating to the discharge port and having a bubble generation area for generating a bubble in liquid; and a movable member that is provided facing the bubble generation area and is displaced following growth of the bubble, and the ink is supplied to the liquid flow path and discharged from the discharge port by thermal energy from the heating element.

In addition, an aspect of a recording unit in accordance with the present invention is a recording unit provided with an ink containing portion in which ink is contained and a recording head portion for discharging the ink as ink droplets, which is characterized in that;

the ink is ink containing a coloring material including at least self-dispersing carbon blacks, which are formed of at least one hydrophilic group bonded to a surface of a carbon black directly or via another is atom group, and an aqueous medium and further having potassium ions of 0.6% or more in a mass ratio with respect to the carbon black; and the recording head includes a structural unit for discharging liquid droplets having a heating element for generating thermal energy for generating a bubble in liquid; a discharge port that is a portion for discharging the liquid; a liquid flow path communicating to the discharge port and having a bubble generation area for generating a bubble in liquid; and a movable member that is provided facing the bubble generation area and is displaced following growth of the bubble.

An aspect of an ink jet recording apparatus in accordance with the present invention is an ink jet recording apparatus provided with a recording unit having an ink containing portion in which ink is contained and a recording head portion for discharging the ink as ink droplets by an action of energy, which is characterized in that, the ink is ink containing a coloring material including at least self-dispersing carbon blacks, which are formed of at least one hydrophilic group bonded to a surface of a carbon black directly or via another atom group, and an aqueous medium and further having potassium ions of 0.6% or more in a mass ratio with respect to the carbon black, and the recording head includes a structural unit for discharging liquid droplets having a heating element for generating thermal energy for generating a bubble in liquid; a discharge port that is a portion for discharging the liquid; a liquid flow path communicating to the discharge port and having a bubble generation area for generating a bubble in liquid; and a movable member that is provided facing the bubble generation area and is displaced following growth of the bubble, and the ink is supplied to the liquid flow path and discharged from the discharge port by thermal energy from the heating element.

Another aspect of the ink jet recording apparatus in accordance with the present invention is an ink jet recording apparatus provided with an ink cartridge including an ink containing portion in which ink is contained and a recording head for discharging the ink as ink droplets by an action of energy, which is characterized in that;

the ink is ink containing a coloring material including at least self-dispersing carbon blacks, which are formed of at least one hydrophilic group bonded to a surface of a carbon black directly or via another atom group, and an aqueous medium and further having potassium ions of 0.6% or more in a mass ratio with respect to the carbon black, and the recording head includes a structural unit for discharging liquid droplets having a heating element for generating thermal energy for generating a bubble in liquid; a discharge port that is a portion for discharging the liquid; a liquid flow path communicating to the discharge port and having a bubble generation area for generating a bubble in liquid; and a movable member that is provided facing the bubble generation area and is displaced following growth of the bubble, and the ink is supplied to the liquid flow path and discharged from the discharge port by thermal energy from the heating element.

Another aspect of the ink jet recording method in accordance with the present invention is an ink jet recording method having steps of giving energy to ink, discharging the ink from a recording head and depositing the ink on a recording medium, which is characterized in that;

the ink is ink containing self-dispersing pigment having a hydrophilic group as a coloring material and also containing counter ions with respect to the hydrophilic group and ions with hydration force lower than that of the hydrophilic group while having a polarity opposite that of the hydrophilic group in addition to the counter ions; and the recording head consists of a configuration having a heating element for generating thermal energy for generating a bubble in liquid; a discharge port that is a portion for discharging the liquid; a liquid flow path communicating to the discharge port and having a bubble generation area for generating a bubble in liquid; and a movable member that is provided facing the bubble generation area and is displaced following growth of the bubble, and the ink is supplied to the liquid flow path and discharged from the discharge port by thermal energy from the heating element.

Another aspect of the recording unit in accordance with the present invention is a recording unit provided with an ink containing portion in which ink is contained and a recording head portion for discharging the ink as ink droplets, which is characterized in that;

the ink is ink containing self-dispersing pigment having a hydrophilic group as a coloring material and containing counter ions with respect to the hydrophilic group and also ions with hydration force lower than that of the hydrophilic group while having a polarity opposite that of the hydrophilic group in addition to the counter ions; and the recording head consists of an ink jet head having a heating element for generating thermal energy for generating a bubble in liquid; a discharge port that is a portion for discharging the liquid; a liquid flow path communicating to the discharge port and having a bubble generation area for generating a bubble in liquid; and a movable member that is provided facing the bubble generation area and is displaced following growth of the bubble.

Another aspect of the ink jet recording apparatus in accordance with the present invention is an ink jet recording apparatus provided with a recording unit having an ink containing portion in which ink is contained and a recording head portion for discharging the ink as ink droplets by an action of energy, which is characterized in that, the ink is ink containing self-dispersing pigment having a hydrophilic group as a coloring material and containing counter ions with respect to the hydrophilic group and ions with hydration force lower than that of the hydrophilic group while being in a polarity opposite that of the hydrophilic group in addition to the counter ions, and the recording head consists of an ink jet head having a heating element for generating thermal energy for generating a bubble in liquid; a discharge port that is a portion for discharging the liquid; a liquid flow path communicating to the discharge port and having a bubble generation area for generating a bubble in liquid; and a movable member that is provided facing the bubble generation area and is displaced following growth of the bubble.

Another aspect of the ink jet recording apparatus in accordance with the present invention is an ink jet recording apparatus provided with an ink cartridge including an ink containing portion in which ink is contained and a recording head for discharging the ink as ink droplets by an action of energy, which is characterized in that;

the ink is ink containing self-dispersing pigment having a hydrophilic group as a coloring material and containing counter ions with respect to the hydrophilic group and also ions with hydration force lower than that of the hydrophilic group while having a polarity opposite that of the hydrophilic group in addition to the counter ion; and the recording head has a heating element for generating thermal energy for generating a bubble in liquid; a discharge port that is a portion for discharging the liquid; a liquid flow path communicating to the discharge port and having a bubble generation area for generating a bubble in liquid; and a movable member that is provided facing the bubble generation area and is displaced following growth of the bubble.

According to the present invention, a flow area in which a cross section of a liquid flow path of a recording head is sharply narrowed is formed by a configuration having a movable member and a regulating portion provided in the liquid flow path, where by locking of solids due to evaporation of a solvent component of ink or the like and deterioration of discharge performance are stemmed, and thus stability of discharge and discharging power can be maintained even if recording is resumed after leaving the recording head unused. In addition, concentration of carbon black is prevented by existence of potassium ions contained in the ink and a more superior locking prevention effect is realized. Therefore, an excellent property can be obtained with respect to the intermittent dischargeability (ejection stability in intermittent ejection) and the retentivity by a combination of ink with a specific composition and a recording head having independent actions in the upstream side and the downstream side divided by a heating element in the middle.

On the other hand, if the movable member is provided facing the heating element in the recording head used in the present invention, components of ink on the heating element, in particular the amount of moisture, are retained at a relatively high ratio even if a solvent component or the like of the ink evaporates from the discharge port. Thus, since stability of bubbling is maintained in this area, decrease of the discharging power can be prevented. Since concentration of carbon blacks is avoided by potassium ions also in an area from the discharge port to the movable member and the regulating portion, the degree of locking of solids can be effectively suppressed to an extremely low level. Therefore, excellent properties can be obtained with respect to the intermittent dischargeability (ejection stability in intermittent ejection) and the retentivity by a combination of ink with a specific composition and a recording head having independent actions in the upstream side and the downstream side divided by a heating element in the middle.

Moreover, if solvent or the like of ink evaporates from the discharge port of the recording head, a flow path resistance that is different between the upstream side and the downstream side of the heating element in the middle becomes overwhelmingly large on the discharge port side. However, in the present invention, since the space between the movable member and the regulating portion is substantially closed at the time of bubbling by actions of these portions, the flow path resistance becomes extremely large on the upstream side despite the evaporation, whereby there is no loss of power on the discharge port side. In particular, since concentration of carbon blacks is avoided by potassium ions in the area from the discharge port to the movable member and the regulating portion as well, a degree of locking of solids can be effectively suppressed to an extremely low level. Therefore, excellent properties can be obtained with respect to the intermittent dischargeability (ejection stability in intermittent ejection) and the retentivity by a combination of ink with a specific composition and a recording head having independent actions in the upstream side and the downstream side divided by a heating element in the middle.

BRIEF DESCRIPTION OF THE DRAWINGS

The accompanying drawings, which are incorporated in and constitute a part of the specification, illustrate embodiment modes of the invention and, together with the description, serve to explain the principles of the invention, in which.

DETAILED DESCRIPTION OF THE PREFERRED EMBODIMENTS

Figure 1A:
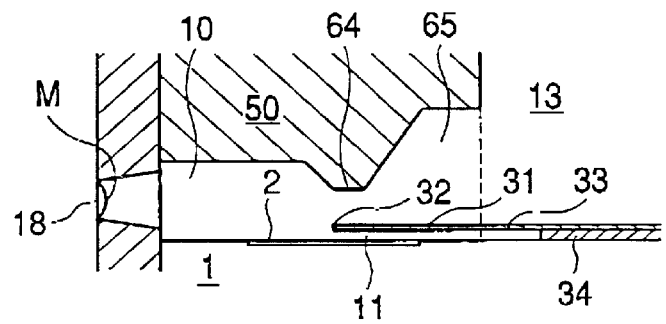
FIGS. 1A, 1B, 1C, 1D, 1E and 1F are sectional views showing an example of an ink jet head cut in a liquid flow path direction.

Preferred embodiment modes of the present invention will be hereinafter described with reference to the drawings.

In addition, in the accompanying drawings, same reference numerals designate the same or similar parts throughout the figures thereof.

Figure 11A:
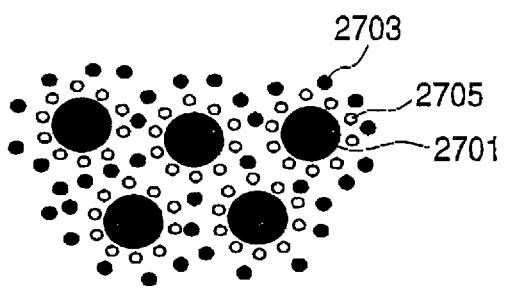
FIGS. 11A, 11B and 11C illustrate a mechanism of an effect of the present invention.

First, studies of the present invention by the inventors of the present invention will be described with reference to FIGS. 11A, 11B and 11C and FIGS. 12A and 12B concerning behaviors of ink using potassium salt as salt. FIG. 11A is a schematic view showing a state of self-dispersing carbon blacks in ink containing the carbon blacks. In the figure, reference numeral 2701 denotes self-dispersing carbon blacks, 2705 denotes hydrophilic group counter ions of the carbon blacks, and 2703 denotes water molecules. The self-dispersing carbon blacks 2701 maintain a stable dispersed state by retaining affinity with the water molecules existing around it.

Figure 11B:
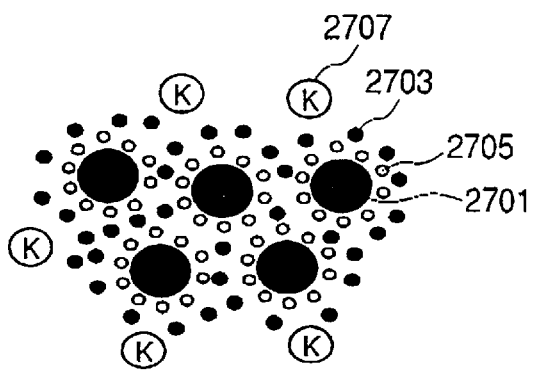
Figure 11C:
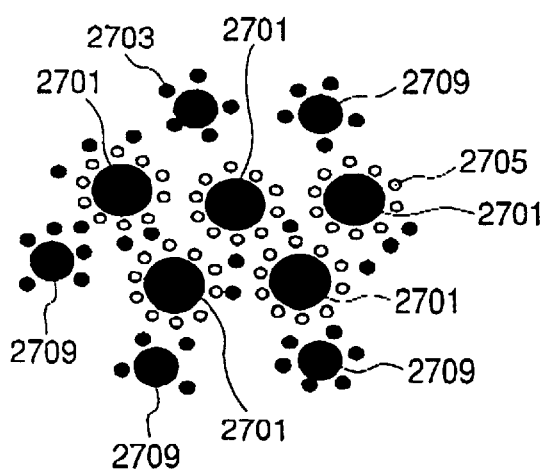
Figure 12A:
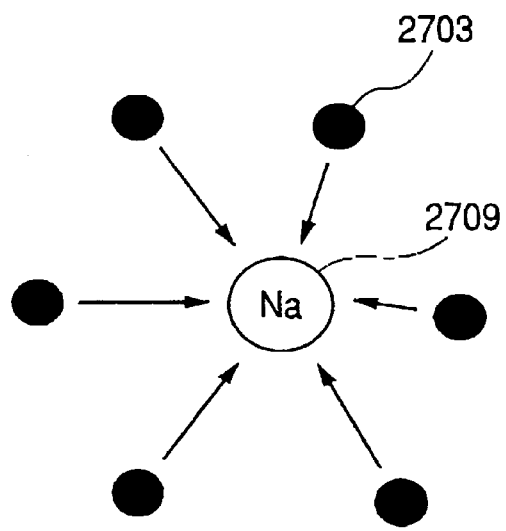
FIGS. 12A and 12B illustrate differences between hydration tendency of a sodium ion or the like and a potassium ion.
Figure 12B:
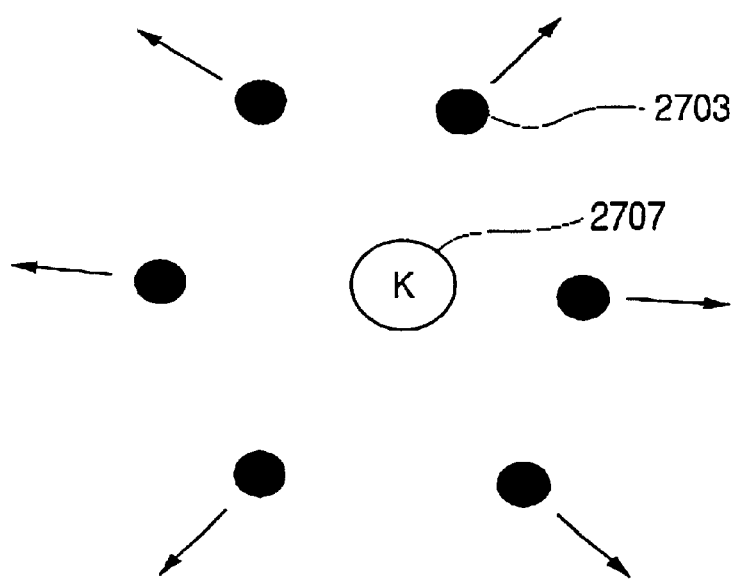

Here, the case in which potassium salt is added to ink as salt is shown in FIG. 11B and the case in which sodium salt is added to the ink is shown in FIG. 11C. A potassium ion shows a negative hydration tendency as shown in FIG. 12B, whereas a sodium ion, a lithium ion and the like show a positive hydration tendency as shown in FIG. 12A.

If sodium ions exist in ink at a predetermined concentration, the water molecules 2703 existing around the self-dispersing carbon blacks tend to be localized on the sodium ion side. On the other hand, such a large change in the relation between the self-dispersing carbon black and the water molecules is not recognized if potassium ions are present compared with the case in which potassium ions are not present.

It is needless to mention that this state schematically describes an instant state when each kind of ink exists and does not indicate the ink is always in this state. It is simply assumed that the ink is often in this kind of state in terms of probability. Therefore, the dispersion stability of carbon blacks of ink containing sodium salt does not always immediately decline.

Further, the present invention has been devised based on technical knowledge and study indicating that the aforementioned effects are obtained if the ink containing potassium ions exhibiting such a function is used in conjunction with a recording head having the movable member and the regulating portion.

Figure 8A:
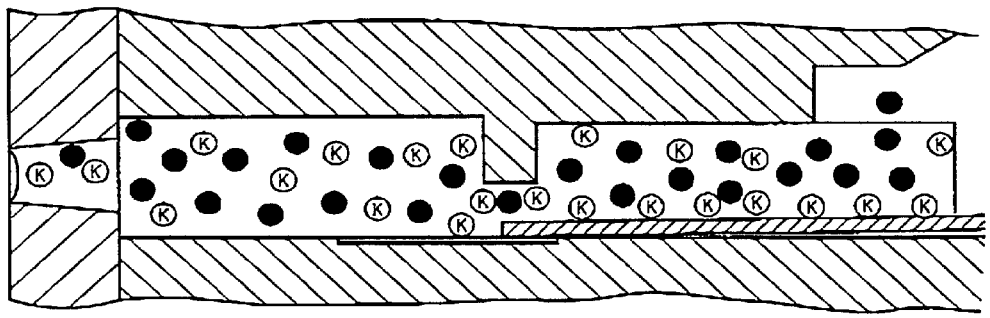
FIGS. 8A, 8B and 8C are views for illustrating behaviors of potassium ions and pigment in ink in the ink jet head having the movable member.
Figure 8B:
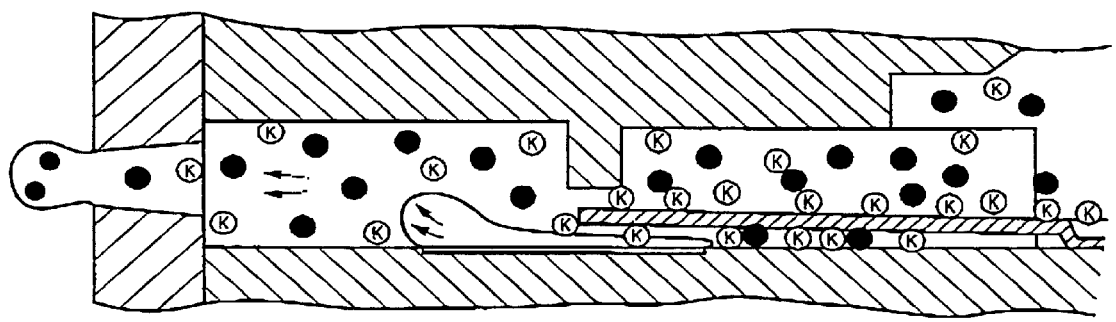
Figure 8C:
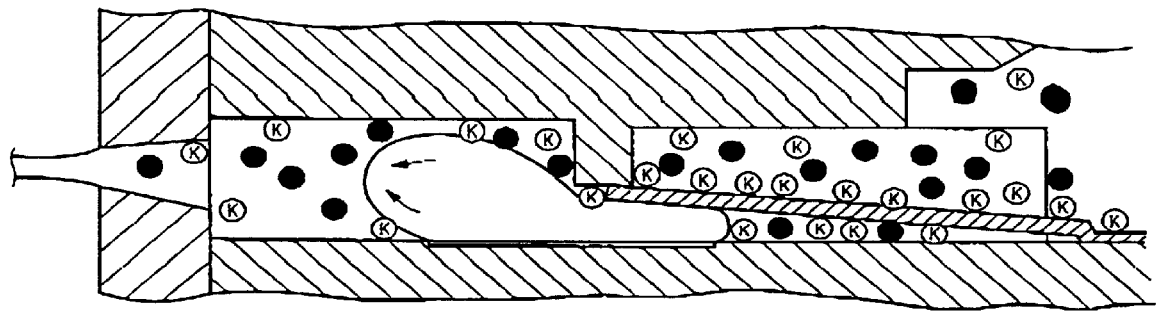

Moreover, in the case in which the movable member is used, pigment dispersed in ink may be deposited on the movable member and, when the amount of deposition increases, stability in operations of the movable member may not be obtained. On the other hand, in the present invention, since a predetermined concentration of potassium ions is present, deposition of such pigment on the movable member is effectively suppressed. This effect of preventing deposition of pigment by potassium ions is considered to be obtained by the state indicated in FIGS. 8A to 8C. That is, when potassium ions (K) exist in black ink together with pigment (●), a stable dispersion state of the pigment is maintained by retaining affinity with water molecules. Then, since pigment existing in an area where it comes into contact with the movable member as it moves also retains its affinity with the water molecules, it becomes hard for the pigment to be deposited on the movable member side and the dispersion state is also maintained by the presence of the potassium ions.

The inventors of the present invention repeated detailed studies on individual effects, composite effects and the like in the above-mentioned two points for ink using pigment, in particular self-dispersing carbon black, in view of the above-mentioned technical background. As a result, the inventors of the present invention found, for example, that by including potassium ions at 0.6% or more in a mass ratio with respect to carbon blacks, even carbon blacks to which salt was added for the purpose of reducing paper type dependency of the image density and reducing the bleeding in a boundary between black and color, satisfactory intermittent dischargeability and retentivity of ink are acquired, even without much dependence on the structure of the recording head to be used. Also, the ink is easier to use as ink for ink jet than before, and the image quality of the ink could be satisfactory. In this way, the inventors of the present invention came to devise the present invention.

The present invention will be described more in detail with reference to preferred embodiments.

An embodiment of ink in accordance with the present invention is ink which is characterized by containing a coloring material including at least self-dispersing carbon blacks, which are formed of at least one hydrophilic group bonded to a surface of a carbon black directly or via another atom group, and an aqueous medium and having potassium ions of 0.6% or more in a mass ratio with respect to the carbon black. Materials forming this ink will be hereinafter described, respectively.

[Potassium Ion]

A concentration of potassium ions in ink in accordance with this embodiment is preferably 0.6% or more in a mass ratio with respect to carbon blacks. In addition, it is also possible to maintain preservation stability or the like of the ink itself at an extremely high level by making a concentration of the ink less than 50% in a mass ratio with respect to the carbon blacks.

That is, if the concentration of potassium ions is within this range, the ink can be established as ink for ink jet in which remarkable improvement of the intermittent dischargeability and the retentivity is realized. The inventors of the present invention believe that the above-mentioned improvement of the intermittent dischargeability and the retentivity is more effective in adjusting the concentration of potassium ions in the ink to the above-mentioned range rather than in adjusting a pH value of ink to an appropriate range to improve dispersion stability of self-dispersing carbon blacks.

The above-mentioned effect is described from the fact that, when the pH value of ink containing potassium hydrate, potassium benzoate or the like and the pH value of ink containing amines such as ammonium and triethanolamine are adjusted to be equal to each other such that the potassium concentration in the ink is in the above-mentioned range and the intermittent dischargeability and the retentivity of the respective inks are compared, improvement of the intermittent dischargeability and the retentivity is more remarkable in the ink with the potassium concentration adjusted to be in the above-mentioned range than in the other ink of the same pH value. In addition, even when compared with ink containing lithium and sodium belonging to the same alkaline metals, the improvement of the intermittent dischargeability and the retentivity of the ink containing potassium is found to be superior.

It is needless to mention that the stability of the ink of the present invention is improved when the pH value is on the alkaline side. When this fact and the present invention are combined, the effect of the present invention becomes easier to be obtained. The anionic self-dispersing carbon blacks in accordance with the present invention tend to lack dispersion stability in an acid solution, so that when taking ink touch performance with a recording head into account, a preferred pH range of ink to be used in the present invention is 7 or more and 10 or less.

Although detailed reasons why the ink of the present invention shows the above-mentioned properties are unknown, it appears to be because decrease of the dispersion stability and re-dispersibility of self-dispersing carbon blacks is improved by mutual actions of potassium ions existing at a predetermined amount in the ink and hydrophilic groups bonded to the surface of the carbon blacks. That is, the present invention is fundamentally conceptually different from the addition of potassium hydrate or the like for making a dispersant soluble, that is, for making the dispersing liquid turn alkaline.

In addition, the ink used in the present invention, when considered solely as an ink, apart from the discharge apparatus, is more stable when its pH is on the alkaline side than on the neutral side. However, the essence of the present invention is not to pursue the stability of an ink as ink alone, but to place its main aim in improvement of the stability in the vicinity of a discharge port. The present invention is fundamentally conceptually different from the addition of potassium hydrate or the like for turning the dispersing liquid alkaline from this point of view as well.

Moreover, a mechanism of showing effects by the existence of potassium ions will be hereinafter described more in detail with reference to FIGS. 11A to 11C. FIGS. 11A, 11B and 11C are schematic views for illustrating a mechanism in which the existence of potassium ions brings about the effects of the present invention. In the figure, reference numeral 2703 denotes water molecules, 2709 denotes sodium ions, 2707 denotes potassium ions, 2701 denotes self-dispersing carbon blacks, and 2705 denotes hydrophilic group counter ions of carbon blacks.

As shown in FIG. 11A, the self-dispersing carbon blacks 2701 usually have the counter ions 2705, and a multiplicity of water molecules 2703 exist and disperse in a stable state around the hydrophilic group counter ions. A proposed representation of the situation in which a large amount of monovalent cation ions are present in the ink and the cations are present in addition to counter ions of carbon is shown in FIGS. 11B and 11C.

That is, in the case in which a large amount of potassium ions 2707 are present as cations other than the counter ions of the self-dispersing carbon blacks around it, the state is not so largely different from the state shown in FIG. 11A and deterioration of the dispersion stability or the like is not observed. On the other hand, in the case in which sodium ions are present as cations other than the counter ions around the self-dispersing carbon blacks, the water molecules 2703 tend to be present around the sodium ions 2709 rather than around the self-dispersing carbon blacks 2701 as shown in FIG. 11C. As a result, it is surmised that the dispersion stability of the self-dispersing carbon blacks is deteriorated.

In this case, it is believed that the difference shown in FIGS. 11A to 11C is difficult to generate due to the type of counter ions. The counter ions are not particularly limited to potassium ions and may be sodium ions or the like. It is needless to mention that ions move in ink, and identical ions do not always exist as counter ions of carbon but ions in ink always exchange for each other. The conceptual views shown in FIGS. 11A to 11C show states of certain instances.

However, if a large amount of potassium ions exist in ink, it is considered that it is highly likely that the ink is in the state shown in FIG. 11B, and if a large amount of sodium ions exist, it is highly likely that the ink is in the state shown in FIG. 11C. The difference between both the states is due to a difference of hydration tendency of ions. Lithium ions, sodium ions and the like are very easily hydrated compared with potassium ions.

In this respect, the inventors of the present invention consider that the difference is due to the fact that sodium ions or lithium ions show so-called positive hydration tendency whereas potassium ions show negative hydration tendency. That is, it appears that the difference occurs because water molecules originally existing around self-dispersing carbon blacks and maintaining dispersion stability move apart from around the self-dispersing carbon blacks due to strength of hydration tendency of these ions and come to exist around cation ions.

That is, it is considered that potassium ions have a hydration tendency weaker than that of self-dispersing carbon blacks and do not move water molecules existing around the self-dispersing carbon blacks to around itself. Further, FIG. 12 is a conceptual view for illustrating the point that sodium ions or the like and potassium ions have different hydration tendencies.

It is needless to mention that it is ideal if all the self-dispersing carbon blacks in ink are in the state as shown in FIG. 11B. However, as a result of the inventors' earnest examination, it has been found that, in order to show the effects of the present invention, all the self-dispersing carbon blacks may not always be in the state as shown in FIG. 11B but may be partly in the state as shown in FIG. 11C. In other words, it has been found that the effects of the present invention are shown even in a mixed system of the states as shown in FIGS. 11B and 11C. That is, the inventors of the present invention have reached the conclusion that the effects of the present invention are shown if ink has potassium ions of 0.6% or more in a mass ratio with respect to carbon blacks.

As described above, the mechanism surmised by the inventors of the present invention is described in detail. In the technical concepts of the present invention, it is important that the hydration tendency of monovalent cation ions existing around self-dispersing carbon black be weak compared with that of the self-dispersing carbon, which is an important factor. Therefore, it is considered that ions other than potassium ions are within the technical concept of the present invention as long as the ions have the same property as potassium ions (non-affinity tendency with respect to water).

In addition, the effects of the above-mentioned phenomenon become more remarkable when employing a recording head having a portion giving turbulence to a flowing state of ink in accordance with the ink supply, for example, a recording head having a portion where the flow path resistance varies to a great degree in an ink flow path. Details of reasons for this are uncertain, but the inventors of the present invention surmise the reasons as described below.

The phenomena described above with reference to FIGS. 11A to 11C are extremely unlikely to occur in ink in a closed state (in other words, in a state in which the ink is not subjected to any external factor other than time and gravity). However, as described above, even in the same ink, its retentivity or the like varies largely depending on the recording head to be used.

In view of this point, the inventors of the present invention considers that something in the recording head triggers significant deterioration of the dispersion stability of the ink. As a result of earnest examination about the trigger, it has become clear that the deterioration is due to the structure of the recording head rather than materials in the recording head. That is, it is considered that it is the trigger of the deterioration that the flow path resistance varies to a large degree in the ink flow path.

It is considered that such variation of the flow path resistance is caused in accordance with discharge operation in an ink jet head of a configuration having a movable member in a liquid flow path, whereby dispersion stability of pigment is decreased. As described before, the present invention maintains such dispersion stability by adding potassium ions thereto.

[Self-dispersing Carbon Black]

A self-dispersing carbon black is a carbon black in which at least one hydrophilic group is bonded to a surface of a carbon black directly or via another atom group. As a result of an introduction of this hydrophilic group into the surface of the carbon black, dispersing agent for dispersing the carbon black becomes unnecessary, which is required in conventional ink. As the self-dispersing carbon black, those having the ionic nature are preferable.

A carbon black charged in this anionic nature is exemplified by a carbon black with hydrophilic groups as shown below bonded to its surface.

—COOM, —SO$_3$M, —PO$_3$HM, —PO$_3$M$_2$

In the above formulas, M represents a hydrogen atom, an alkaline metal, ammonium or organic ammonium. Since a carbon black having, in particular, —COOM or —SO$_3$M among the above bonded to its surface and charged in the anionic nature has a satisfactory dispersing nature in ink, it can be particularly preferably used in this embodiment.

Note that, among the above hydrophilic groups, as specific examples of an alkaline metal represented by M, there are, for example, Li, Na, K, Rb and Cs. In addition, as specific examples of organic ammonium, there are, for example, methylammonium, dimethylammonium trimethylammonium, ethylammonium, diethylammonium, triethylammonium, methanolammonium, dimethanolammonium, trimethanolammonium.

Ink containing self-dispersing carbon blacks having M as ammonium or organic ammonium can improve water resistance of a recorded image, which can be used preferably in this respect. This is considered to be due to an influence of a phenomenon in which, when the ink is supplied onto a recording medium, ammonium is dissolved and ammonia evaporates.

Here, as a method of turning M into ammonium in the self-dispersing carbon black, there are, for example, a method of applying the ion exchange method to the self-dispersing carbon black having alkaline metal as M to replace alkaline metal with ammonium and a method of turning M into ammonium by adding ammoniumhydroxide after turning M into H type by adding acid.

As a method of manufacturing a self-dispersing carbon black charged in anionic nature, there is, for example, a method of acidizing a carbon black with hypochlorous acid soda. With this method, —COONa group can be chemically bonded onto the surface of the carbon black.

Note that, the above-mentioned various hydrophilic groups may be bonded to a surface of a carbon black directly. Alternatively, the hydrophilic groups may be bonded to the surface of the carbon black indirectly by having another atom group to intervene between the surface of the carbon black and the hydrophilic groups.

Here, as specific examples of another atom group, there are, for example, straight chain or branch chain alkylene with the carbon number of 1 to 12, substituted or unsubstituted phenylene and substituted or unsubstituted naphthylene. As examples of a substituted group of the phenylene or naphthalene, there is, for example, straight chain or branch chain alkyl with the carbon number of 1 to 6. In addition, as specific examples of a combination of another atom group and a hydrophilic group, there are, for example, 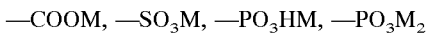—COOM, —Ph—SO$_3$M and —Ph—COOM (provided that, Ph represents phenylene and M is defined the same as above).

Moreover, as a result of the inventors' earnest examination, the above-mentioned self-dispersing carbon black charged in the anionic nature shows especially excellent intermittent dischargeability and retentivity by using a carbon black with a hydrophilic group concentration of 1.8 $\mu$mol/m$^2$ or more with potassium. As a reason for this, it is considered that potassium ions improve the dispersion stability and the re-dispersibility by mutual actions with a hydrophilic group and that this effect is especially perceptible when a carbon black of a hydrophilic group concentration in the above-mentioned range is used.

In addition, in the present invention, a self-dispersing carbon black to be contained in ink is not limited to one type, and two or more types of self-dispersing carbon blacks may be used to adjust tint. In addition, an amount of addition of self-dispersing carbon black in pigment ink of the present invention is preferably 0.1 mass % or more and 15 mass % or less and more preferably 1 mass % or more and 10 mass % or less. Moreover, tint of ink may be adjusted using a dye in addition to a self-dispersing carbon black.

(Concentration of Hydrophilic Group)

As a method of measuring a concentration of a hydrophilic group of a self-dispersing carbon black, there is, for example, a method of refining carbon dispersing liquid to turn all counter ions into sodium ions, measuring the sodium ions by a probe sodium electrode and converting a dispersed body concentration into ppm per one solid. Here, the conversion is performed on the assumption that a hydrophilic group such as a carboxyl or the like exists in a same mol as sodium ion being counter ions.

Next, a method of adjusting the potassium content in ink will be described. As a method of adjustment, there is a method of adding it in the form of a salt.

More specifically, there are, for example, potassium hydrate, potassium benzoate, potassium phthalate, potassium acetate, potassium succinate, potassium citrate, potassium gluconate, potassium nitrate, potassium phosphate, potassium sulfate, potassium carbonate, potassium chloride and potassium bromide. The potassium salt as described above can be used alone or as a mixture.

In addition, when potassium ions are added in the above-mentioned form of a salt, a part or all of counter ions of a surface functional group of the self-dispersing carbon black is replaced with potassium ions, although it is needless to mention it depends on the amount of addition.

[Monovalent Cation Ions]

A total amount of monovalent cation ions in ink in accordance with this embodiment is preferably in the range of 0.05 mol/L or more and 1 mol/L or less and more particularly 0.1 mol/L or more and 0.5 mol/L or less with respect to a total amount of aqueous pigment ink. That is, if it is assumed that a total amount of monovalent cation ions is within this range, a high density and a high grade image is realized, and no problem occurs in a property as ink, for example, preservation stability.

It is considered that a high density and a high grade image is realized because, monovalent cation ions are contained in the ink in the above-mentioned predetermined amount as a whole, so that solid and liquid separation occurs immediately after ink discharged from a nozzle deposits on a paper surface. A total amount of monovalent cation ions is important for this phenomenon.

That is, solid and liquid separation at a required speed does not occur in the case in which the total amount of monovalent cation ions is equal to or less than a fixed amount, more specifically less than 0.05 mol/L. In addition, to the contrary, the total amount of monovalent cation ions exceeding 1 mol/L is not preferable in terms of stability of ink itself.

Although capillarity, moisture evaporation or the like is possible as a factor in causing this solid and liquid separation, the inventors of the present invention consider that the largest factor for causing the solid and liquid separation of the ink of the present invention is moisture evaporation after discharge. In addition, although it is needless to mention that capillarity on paper after the arrival of ink is one of the factors causing the solid and liquid separation, the inventors of the present invention consider that the moisture evaporation after discharge is the largest factor for causing the solid and liquid separation of the ink in accordance with the present invention based on the facts described below.

The solid and liquid separation of the ink of the present invention occurs earlier even on a clean glass surface compared with ink with the total amount of monovalent cation ions in the ink equal to or less than the above-mentioned predetermined amount. That is, this fact realistically indicates that the solid and liquid separation occurs in the ink of the present invention even if the capillarity does not occur. Therefore, the inventors of the present invention came to consider that a largest factor for causing the solid and liquid separation of the ink of the present invention is water evaporation after discharge.

Here, a total amount of monovalent cations indicates all monovalent cations contained in the ink. That is, it means an amount of all cations that exist in ink as cations such as surface functional group counter ions of a self-dispersing carbon black, cations added as pH adjusting agents and cations added in the form of a salt, which can be detected as cations. Here, as a method of quantifying cation ions in ink, there is, for example, a method of using both ion chromatography and plasma emission spectroscopy.

Then, as examples of a monovalent cation, there are, for example, an alkaline metal ion, an ammonium ion and an organic ammonium ion. More specifically, as the alkaline metal ion, there are, for example, a lithium ion, a sodium ion and a potassium ion. As the organic ammonium ion, there are, for example, mono- to tetra-methylammonium ions, mono- to tetra-ethylammonium ions and mono- to tetra-methanolammonium ions.

In addition, as a method of adjusting the total amount of cations in ink, there is, for example, the above-mentioned method of adding cation in the form of a salt. Then, in a combination of a cation and an anion to be its counter ion in the case in which cations are added in the form of a salt, salt of one ion selected out of the ammonium ion, the potassium ion, the sodium ion and the lithium ion as a cation, in particular, the ammonium ion, and one ion selected out of a halogen ion (chloride ion or the like), an acetate ion, a benzoate ion and the like as an anion ion provides ink that is particularly excellent in image density and image grade, supposedly because it is excellent in compatibility with a self-dispersing carbon black.

[Aqueous Medium]

A preferable aqueous medium, which can cause the ink in accordance with each of the above-mentioned embodiments to bear the above-mentioned properties, consists of water alone or a mixed solvent of water and soluble organic solvent. As the soluble organic solvent, one having an effect of preventing the drying of ink is particularly preferable, or it is desirable to use deionized water rather than general water containing various ions.

[Soluble Organic Solvent]

As a soluble organic solvent to be used in the present invention, there are specifically, for example, alkyl alcohols with the carbon number of 1 to 4 such as methyl alcohol, ethyl alcohol, n-propyl alcohol, iso-propyl alcohol, n-butyl alcohol, sec-butyl alcohol, tert-butyl alcohol; amides such as dimethylformamide and dimethylacetamide; ketone or ketoalcohols such as acetone and diacetone alcohol; ethers such as tetrahydrofurane and dioxane; polyalkylene glycols such as polyethylene glycol and polypropylene glycol; alkylene glycols in which an alkylene group includes two to six carbon atoms such as ethylene glycol, propylene glycol, butylene glycol, triethylene glycol, 1,2,6-hexanetriol, thiodiglycol, hexylene glycol and diethylene glycol; low grade alkyl etheracetate such as polyethylene glycol monomethyl etheracetate; glycerin; low grade alkyl ethers of polyvalent alcohol such as ethylene glycol monomethyl (or ethyl) ether, diethylene glycol monomethyl (or ethyl) ether and triethylene glycol monomethyl (or ethyl) ether; polyvalent alcohol such as trimethylol propane and trimethylol ethane; N-methyl-2-pyrrolidone, 2-pyrrolidone, 1,3-dimethyl-2-imidazolidinone and acetylene alcohol. The soluble organic solvent as described above may be used alone or as a mixture.

Although a content of the above-mentioned soluble organic solvent contained in the aqueous pigment ink of the present invention is not specifically limited, it is preferably in the range of 3 mass % or more to 50 mass % or less with respect to an overall mass of the ink. In addition, a content of water contained in the ink is preferably in the range of 50 mass % or more to 95 mass % or less with respect to an overall mass of the ink.

In addition, if adjustment of a surface tension of ink is required, it is effective to appropriately add a surface-active agent such as acetylene alcohol represented by the following formula, a permeable solvent or the like in a predetermined amount.

Structural formula (4)

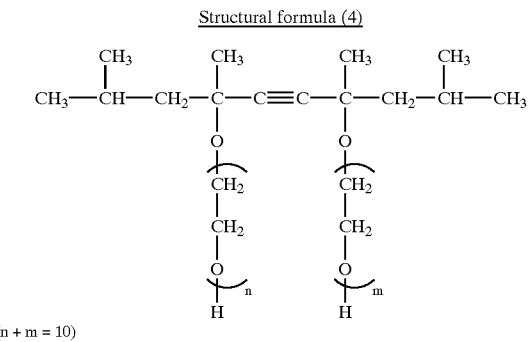

(n + m = 10)

In addition, in order to realize the aqueous pigment ink of the present invention as ink having a desired physical property if necessary in addition to the above-mentioned components, a surface-active agent, an anti-foaming agent, an antiseptic, an anti-mold agent or the like may be added and, further, a commercially available soluble dye or the like may be added thereto.

As described above, the ink of the present invention is particularly effective when used in ink jet recording. As a method of ink jet recording, there is a method of applying mechanical energy to ink to discharge liquid droplets and a method of applying thermal energy to ink to discharge liquid droplets by forming bubbles in the ink. The ink of the present invention is particularly preferable for these recording methods.

A recording head will be described next.

FIGS. 1A to 1F show one embodiment of an ink jet head, which can be preferably utilized in the present invention, in sectional views cut in a liquid flow path direction and also show a characteristic phenomenon in the liquid flow path by dividing it into the steps of A to F.

In this ink jet head, a heating element 2 for applying thermal energy to ink is provided on a flat element substrate 1 as a discharge energy generating element for discharging ink. A liquid flow path 10 is disposed being associated with the heating element 2 on the element substrate 1. The liquid flow path 10 communicates to a discharge port 18 and also communicates to a common liquid chamber 13 for supplying ink to a plurality of liquid flow paths 10, thereby receiving ink of an amount, which is equivalent to an amount of ink discharged from the discharge port 18, from the common liquid chamber 13. Reference symbol M denotes a meniscus formed by discharge liquid. The meniscus M is balanced with an internal pressure of the common liquid chamber 13, which is usually a negative pressure, by a capillary force generated by the internal walls of the discharge port 18 and the liquid flow path 10 communicating to it in the vicinity of the discharge port 18.

The liquid flow path 10 is formed by joining the element substrate 1 provided with the heating element 2 and a ceiling plate 50. In an area in the vicinity of a surface where the heating element 2 and discharge liquid contact, a bubble generating area 11 where the heating element 2 is rapidly heated to generate a bubble in the discharge liquid exists. A part of a movable member 31 is arranged in the liquid flow path 10 having this bubble generating area 11 so as to face the heating element 2. The movable member 31 has a free end 32 on the downstream side to the discharge port 18 and is supported by a supporting member 34 disposed on the upstream side. In particular, in order to suppress growth of a bubble in the upstream half which affects a back wave to the upstream side and an inertia force of ink, the free end 32 is disposed in the vicinity of the center of the bubble generating area 11. Then, the movable member 31 can be displaced with respect to the supporting member 34 as a bubble generated in the bubble generating area 11 grows. A fulcrum 33 for displacement is a supporting portion of the movable member 31 in the supporting member 34.

A stopper (regulating portion) 64 is positioned in the upper center of the bubble generating area 11, which regulates the displacement of the movable member 31 in a given range in order to suppress growth of a bubble in the upstream half. In a flow from the common liquid chamber 13 to the discharge port 18, a low flow path resistance area 65, where a flow path resistance is relatively low compared with the liquid flow path 10, is provided on the upstream side across the stopper 64. A flow path structure in this area 65 has no upper wall and a large flow path cross section, thereby making a resistance received from the flow path in response to movement of liquid small.

With the above-mentioned configuration, a characteristic head structure is realized in which the liquid flow path 10 having the bubble generating area 11 forms a substantially closed space except the discharge port 18 by the contact of the displaced movable member 31 and the stopper 64.

A discharge operation of the ink jet head of this embodiment will now be described in detail.

FIG. 1A shows a state which is before energy such as electric energy is applied to the heating element 2 and before the heating element 2 generates heat. What is important here is that the movable member 31 is provided in a position facing the upstream half of a bubble generated by the heating of the heating element 2 and the stopper 64 for regulating the displacement of the movable member 31 is provided in the upper center of the bubble generating area 11. That is, the upstream half of the bubble is held down by the movable member 31 due to the liquid flow path structure and the disposed position of the movable member.

Figure 1B:
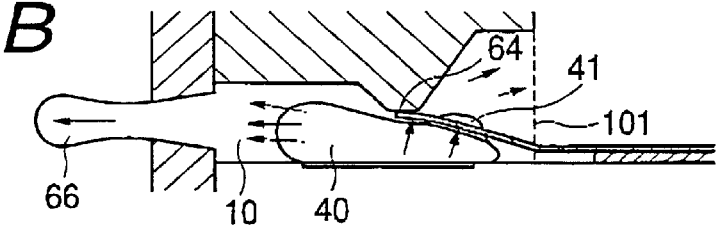

FIG. 1B shows a state in which a part of the ink filling the bubble generating area 11 is heated by the heating element 2 and a bubble 40 generated by the film boiling has grown to substantially maximum. At this point, a pressure wave based on the generation of the bubble 40 propagates into the liquid flow path 10 and the ink moves to the downstream side or the upstream side of the central area of the bubble generating area accordingly. On the upstream side, the movable member 31 is displaced due to a flow of liquid caused by the growth of the bubble 40 and, on the downstream side, a discharged droplet 66 is being discharged from the discharge port 18. Here, the movement of the ink to the upstream side, that is, in the direction of the common liquid chamber 13 becomes a large flow by the low flow path resistance area 65 that is an area where the resistance from the flow path is relatively low compared with that on the downstream side with respect to the movement of the ink and the ink tends to flow. However, when the movable member 31 is displaced to a position where it approaches or contacts the stopper 64, further displacement is regulated, so that movement of the ink in the upstream direction is also significantly limited. Accordingly, the growth of the bubble 40 in the upstream side is also limited by the movable member 31. Thus, a maximum flow path resistance is formed on the upstream side of the bubble generating area of the flow path to make the growth of the bubble in the upstream side substantially uniform. With this configuration, formation of discharge liquid droplets can be more stable and a response frequency dependency characteristic itself can be improved.

In addition, since a moving force of the ink in the upstream direction is large at this point, the movable member 31 is subjected to a stress in the form stretched to the upstream direction. Moreover, a part of the bubble 40 limited by the movable member 31 passes through a small gap between both the side walls forming the liquid flow path 10 and the sides of the movable member 31 to be elevated to the upper surface side of the movable member 31. This elevated bubble is referred to as "elevated bubble (41)" in this specification.

In this state, an overall shape of the liquid flow path to the discharge port side with respect to the movable member 31 takes a form gradually expanding from the upstream side to the downstream side.

In the present invention, as shown in FIGS. 1A to 1F, the flow path between a part of the bubble 40 on the discharge port side and the discharge port is in a "linear communicating state" in which the flow path maintains a straight flow path structure with respect to the liquid flow. It is desirable to form an ideal state in which a discharge state such as a discharge direction and a discharge speed of the discharge droplet 66 is stabilized at an extremely high level more preferably by making a propagation direction of a pressure wave generated when a bubble is generated and a flowing direction and a discharge direction of ink following the propagation of the pressure wave coincide with each other linearly. In the present invention, as one definition for attaining this ideal state or for approximating this ideal state, a configuration in which the discharge port 18 and the heating element 2, in particular, the discharge port side (downstream side) of the heating element having influence to the discharge port side of the bubble are directly connected to each other into a straight line will suffice. This is a state in which, the heating element, in particular, the downstream side of the heating element as seen from outside of the discharge port can be observed if there is no liquid in the flow path.

On the other hand, since displacement of the movable member 31 is regulated by the stopper 64 in the part on the upstream side of the bubble 40 as described above, the part is made small in a state in which the movable member 31 is bent in a protruded shape to the upstream side by an inertia force of the liquid flow to the upstream side to charge stress. In this part as a whole, an amount of the bubble flowing into an area on the upstream side is reduced to almost zero by the stopper and a liquid flow path partitioning wall 101, a movable member 31 and the fulcrum 33. (However, a partly elevated bubble into a gap between the movable member 31 and the liquid flow path partitioning wall 101, which is a space of 10 μm or less, is allowed.)

Thus, a liquid flow to the upstream side is significantly regulated, and a liquid crosstalk to an adjacent nozzle or a reverse flow and pressure vibration of liquid in a supply path system which hinder fast refill to be described later are prevented.

Figure 1C:
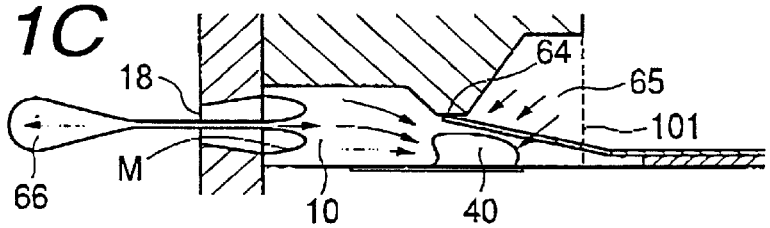

FIG. 1C shows a state in which the negative pressure inside the bubble overcomes the movement of the ink to the downstream side after the above-mentioned film boiling and contraction of the bubble 40 is started. At this point, since force of the ink in the upstream direction due to the bubble growth is left to a great degree, the movable member 31 is in the state in which it is still contacted by the stopper 64 for a fixed period after the contraction of the bubble 40 is started. Thus, the contraction of the bubble 40 generates a liquid moving force in the upstream direction from the discharge port 18 in most cases. In the state of FIG. 1B, the movable member 31 is in the stress charging state in which it is bent in a protruded shape to the upstream side. Thus, a force for pulling the liquid flow back from the side releasing the stress, that is, the upstream side and changing the movable member 31 to a recessed shape with respect to the upstream direction is generated in the movable member 31 itself in FIG. 1C. Therefore, the pulling back force of the movable member from the upstream side overcomes the moving force of the liquid in the above-mentioned upstream direction from a certain point of time to generate a slight flow from the upstream side to the discharge port side. Then, the movable member 31 reduces its bend and displacement to a recessed shape in the upstream direction begins. That is, an unbalanced state on the upstream side and the downstream side of the bubble 40 is generated, in which a one-way flow of the ink in the liquid flow path as a whole heading to the discharge port direction is generated temporarily.

At a timing immediately after that, as the entire inside of the liquid flow path, the liquid flow path 10 having the bubble generating area 11 is still in substantially a closed state except the discharge port 18 by the contact of the displaced movable member 31 and the stopper 64. Thus, contraction energy of the bubble 40 strongly works as a force to move the ink in the vicinity of the discharge port 18 in the upstream direction for an overall balance of force. Therefore, the meniscus M is pulled into the liquid flow path 10 largely at this point to promptly cut off a liquid column connecting to the discharge liquid droplet 66 with a strong force. As a result, as shown in FIG. 1D, a liquid droplet left outside the discharge port 18, that is a satellite (sub-droplet) 67 becomes small.

Figure 1D:
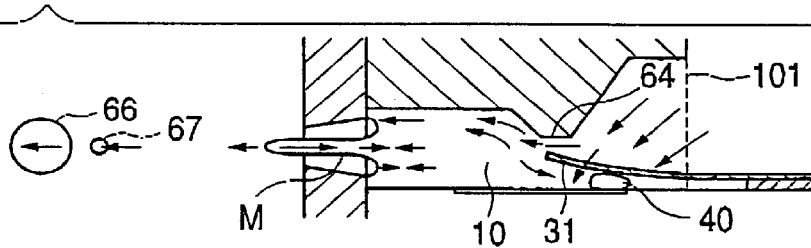

In FIG. 1D, a state in which the bubble disappearance step is almost finished and the discharge liquid droplet 66 and the meniscus M are separated is shown. In the low flow path resistance area 65, downward displacement of the movable member 31 and a flow in the downward direction in the low flow path resistance area 65 following the displacement are started by contraction by the repulsion of the movable member 31 and the disappearance of the bubble 40 with respect to the moving force in the upstream direction of the ink, and the approaching or contacting state between the movable member 31 and the stopper 64 starts to be released. Then, the flow in the downstream direction in the low flow path resistance area 65 rapidly becomes a large flow to flow into the liquid flow path 10 via the stopper 64 because the flow path resistance is small. Thus, since the flow rapidly guiding the meniscus M into the liquid flow path 10 suddenly decreases, the meniscus M starts to return to the position before the bubbling relatively slowly while incorporating the liquid column portion remaining outside or forming a protrusion in the direction of the discharge port 18 without separating it as much as possible. In particular, the return flow of the meniscus M and the refill from the upstream join each other, whereby an area where a flow rate is almost zero is formed between the discharge port 18 and the heating element 2 and the convergence of the meniscus is good. In the present invention, what causes this liquid column to separate to be a satellite and deposit on a print to decrease the image grade, deposit in the vicinity of an orifice to adversely affect the discharge direction and cause discharge deficiency can be significantly reduced, although this also depends the viscosity and surface tension of the ink.

In addition, since the meniscus M itself also starts to return to the original position before being taken into the liquid flow path largely, it completes returning in a short time even if a liquid moving speed is not so high. Thus, overshoot of the meniscus M, that is, an amount of ink that does not stop at the discharge port 18 and forms a protruded shape to the outside of the discharge port 18 can be reduced, and an attenuation vibration phenomenon with the discharge port 18 used as a convergent point, which is generated following the overshoot, can be finished in an extremely short time. Since this attenuation vibration phenomenon also adversely affects a printing grade, the present invention realizes a stable high-speed printing.

In addition, since the flow into the liquid flow path 10 via the above-mentioned part between the moving member 31 and the stopper 64 increases a flow rate on the wall surface on the ceiling plate 50 side as shown in FIG. 1D, the remaining of micro bubbles or the like is extremely little in this part, which contributes to stability of discharge.

On the other hand, some satellites 67 existing immediately after the discharge droplet 66 are extremely close to the discharge droplet by the rapid meniscus drawing in FIG. 1C, and a phenomenon in which a force attracting the discharge droplet 66 by a swirl of air generated behind the trajectory of the discharge droplet 66, a so-called strip stream phenomenon, occurs.

This phenomenon will be described in detail. In a conventional ink jet head, a liquid droplet does not form a sphere at an instance when ink is discharged from a discharge port but is discharged in a form close to a liquid column having a spherical part at a tip. Then, it is known that, when a tail part is pulled by both a main droplet and a meniscus and is separated from the meniscus, a satellite dot is formed from the tail part, which flies to a member to be recorded together with the main droplet. Since the satellite dot flies following the main droplet, a discharge speed is low by attraction of the meniscus and its place of deposit deviates from that of the main droplet and the printing grade is deteriorated. In the ink jet head according to the present invention, since a force causing the meniscus to move backward is larger than that in the conventional ink jet head as described before, a force drawing the tail part after the main droplet is discharged is strong, whereby a force separating the tail part and the meniscus becomes strong and the timing to separate it becomes early. Therefore, a satellite dot formed from the tail part becomes small and the distance between the main droplet and the satellite dot becomes short. Moreover, since the tail part does not continue to be pulled by the meniscus so long, the discharge speed is not lowered, and the satellite 67 is attracted by a so-called strip stream phenomenon behind the discharge droplet 66.

Figure 1E:
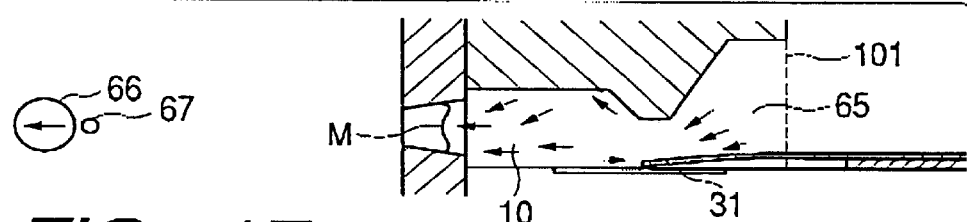

FIG. 1E shows a state in which the state of FIG. 1D has further advanced. The satellite 67 moves closer to the discharge droplet 66, at the same time being attracted, and a drawing force is increased by the strip stream phenomenon. On the other hand, movement of the ink from the upstream side in the discharge port 18 direction is displaced downward from an initial position by the completion of the bubble disappearance step of the bubble 40 and the displacement overshoot of the movable member 31, thereby causing a phenomenon of drawing of the ink from the upstream side and pushing-out of the ink in the discharge port 18 direction. Moreover, the liquid flow in the discharge port 18 direction is increased by the enlargement of the cross section of the liquid flow path where the stopper 64 exists and the return of the meniscus M to the discharge port 18 is accelerated. Thus, the refillability in this embodiment is markedly improved.

In addition, since the bubble disappearance point and the discharge port 18 are divided by downward displacement of the movable member 31 upon generation of cavitation that is generated when a bubble disappears, a shock wave due to the cavitation is not directly communicated to the discharge port 18 and absorbed in the movable member 31 in a large amount. Thus, since generation of micro liquid droplet called a micro dot is hardly generated from the meniscus to which the shock wave by the cavitation reaches, a phenomenon in which the micro dot deposits on a print to decrease an image grade or deposits in the vicinity of the discharge port 18 to destabilize discharge is sharply decreased.

Moreover, since the cavitation generation point by the bubble disappearance deviates to the fulcrum 33 side by the movable member 31, damage to the heating element 2 is reduced. In addition, forced movement of increased adhesion ink is caused between the movable member 31 and the heating element 2 and the ink is removed from this closed area, whereby discharge durability is improved. At the same time, deposit of burnt ink on the heating element 2 in this area is reduced by the same phenomenon, whereby discharge stability is improved.

Figure 1F:
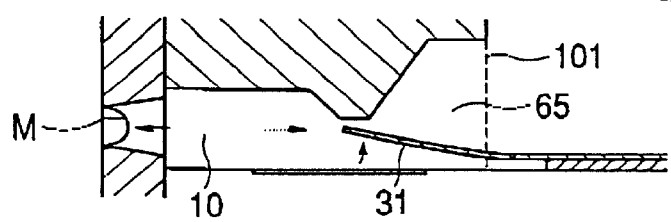

FIG. 1F shows a state in which the state of FIG. 1E has further advanced and the satellite 67 is incorporated in the discharge droplet 66. The combination of the discharge droplet 66 and the satellite 67 is not a phenomenon that always occurs for every discharge in other embodiments as well but may or may not occur depending on a condition. However, an amount of the satellite is at least reduced or eliminated, whereby arrival positions of the main droplet and the satellite dot hardly deviate from each other on a member to be recorded and an influence inflicted on a printing grade becomes extremely small. That is, sharpness of an image is increased and a printing grade is improved and, at the same time, a bad influence such as a change of ink into mist to make a printing medium and inside of a recording apparatus dirty can be reduced.

On the other hand, the movable member 31 generates displacement in the direction of the stopper 64 again by a reaction of its overshoot. This converges by a form and the Young's modulus of the movable member 31, viscosity of ink in the liquid flow path and attenuation vibration determined by a specific gravity and finally stops in the initial position.

The flow of the ink from the common liquid chamber 13 in the direction of the discharge port 18 is controlled by upward displacement of the movable member 31, and the movement of the meniscus M converges without delay in the vicinity of the discharge port 18. Thus, a factor for making a discharge state unstable and decreasing the printing grade such as the overshoot phenomenon of a meniscus can be reduced significantly.

Further characteristic effects of this embodiment will now be described.

Figure 2:
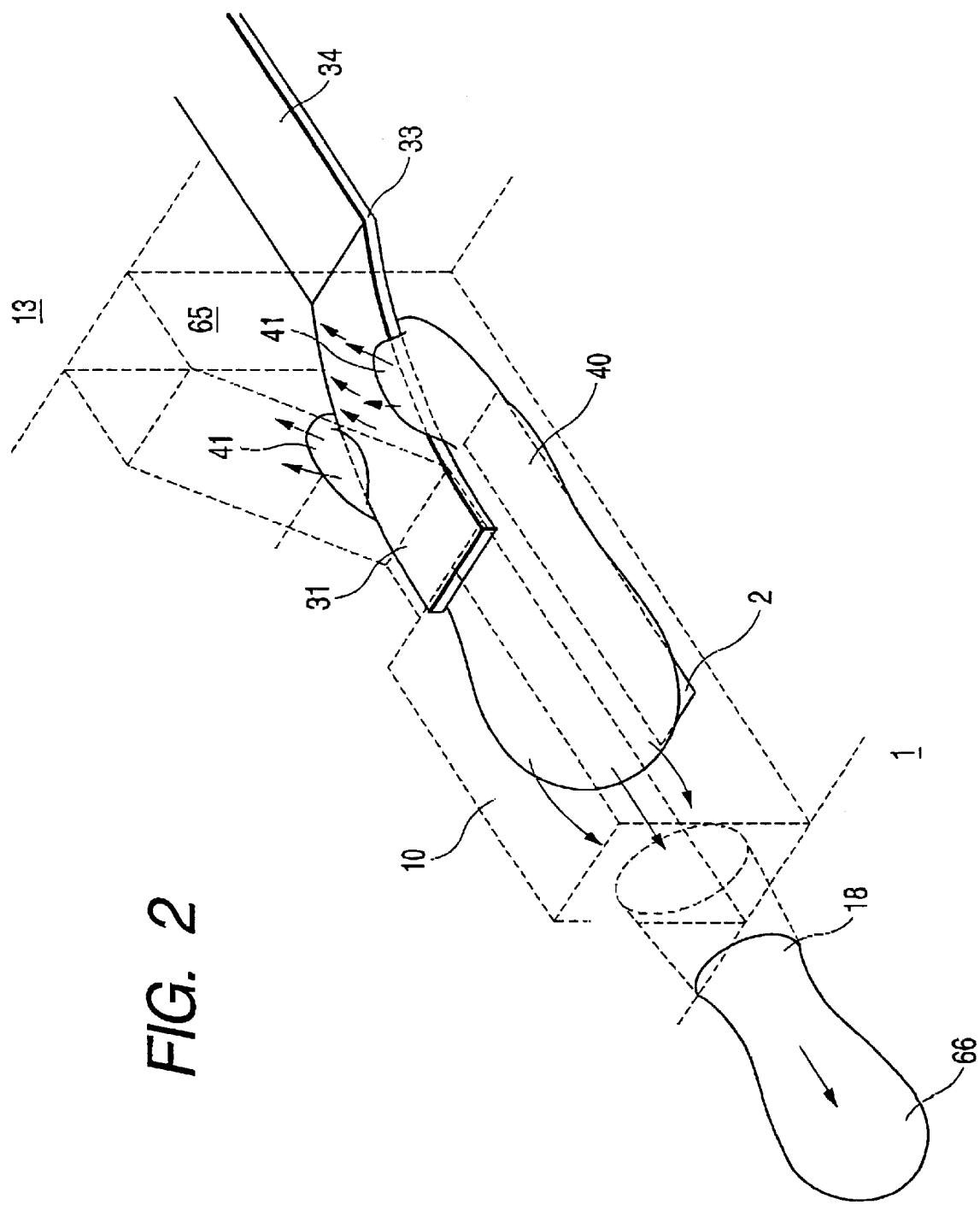
FIG. 2 is a perspective view showing behaviors of ink in the ink jet head.

FIG. 2 is a transparent perspective view of a head that is a part shown in FIG. 1B, which shows basically the same state as FIG. 1B except that the nozzle is looked through and indicated by broken lines. In this embodiment, a slight clearance exists between both the side walls forming the liquid flow path 10 and both the sides of the movable member 31, which allows smooth displacement of the movable member 31. Moreover, in the growth step of bubbling by the heating element 2, the bubble 40 displaces the movable member 31, being also elevated to the upper surface side of the movable member 31 via the above-mentioned clearance to slightly enter the low flow path resistance area 65. The elevated bubble 41 that entered the low flow path resistance area 65 turns about to the back side (the other surface that does not face the bubble generating area 11) of the movable member 31, thereby suppressing deviation of the movable member 31 and stabilizing the discharge property.

Moreover, in the bubble disappearance step of the bubble 40, the elevated bubble 41 facilitates the liquid flow from the low flow path resistance area 65 to the bubble generating area 11 and promptly completes the bubble disappearance in conjunction with the above-mentioned fast drawing of a meniscus from the discharge port 18 side. In particular, bubbles are unlikely to accumulate in the corner of the movable member 31 or the liquid flow path 10 by the liquid flow caused by the elevated bubble 41.

In this way, in the ink jet of the above-mentioned configuration, a discharge liquid droplet is discharged in a state close to a liquid column having a spherical part at the tip in an instance when ink is discharged due to generation of a bubble. In this instance, the movable member is displaced by a growing step of the bubble and, when the displaced movable member contacts a regulating portion, a liquid flow path having a bubble generating area forms a substantially closed space except the discharge port. Therefore, if the bubble disappears in this state, since the above-mentioned closed space is maintained until the movable member is separated from the regulating portion by the bubble disappearance, almost the entire bubble disappearance energy of the bubble works as a force for moving the ink in the vicinity of the discharge port in the upstream direction. As a result, immediately after the starting of the disappearance of the bubble, a meniscus is rapidly pulled into the liquid flow path from the discharge port and the outside of the discharge port and the discharge liquid droplet join each other, whereby a tail part forming the liquid column is quickly cut off with a strong force by the meniscus. Thus, a satellite dot formed from the tail part becomes small, whereby the ink arrival accuracy can be maintained at a high level in high-speed printing and the printing grade can be improved.

Moreover, since the tail part does not continue to be pulled by the meniscus so long, a discharge speed is not lowered and the distance between the discharged droplet and the satellite dot is shortened, the satellite dot is attracted by the so-called strip stream phenomenon behind the discharge droplet. As a result, the combination of the discharged droplet and the satellite dot is also possible, whereby an ink jet head with hardly any satellite dot can be provided.

Further, in the above-mentioned head, the movable member may be provided to control only a bubble growing in the upstream direction with respect to the flow of the ink heading to the discharge port. A configuration in which the free end of the movable member is positioned in substantially the center of the bubble generating area is more preferable. According to this configuration, a back wave to the upstream side and an inertia force of the ink due to growth of the bubble, which do not directly relate to discharge of the ink, can be suppressed and a growth component in the downstream side of the bubble can be directed to the discharge port direction without trouble.

Moreover, the above-mentioned head can employ a configuration in which a flow path resistance of a liquid flow path on the opposite side of the discharge port across the regulating portion is low. According to this configuration, the movement of the ink in the upstream direction by the growth of the bubble becomes a large flow by the liquid flow path of the low flow path resistance, so that when the displaced movable member contacts the regulating portion, the movable member is subjected to a stress in the form of being pulled in the upstream direction. As a result, even if bubble disappearance is started in this state, since the moving force of the ink in the upstream direction due to bubble growth that is left to a great degree, the movable member 31 can keep the above-mentioned closed space for a fixed period until the repulsion of the movable member overcomes this ink moving force. That is, according to this configuration, drawing of a high meniscus is further ensured. In addition, as the bubble disappearance step of the bubble advances and the repulsion of the movable member overcomes the ink moving force in the upstream direction by the growth of the bubble, the movable member is displaced downward to try to return to the initial state, following which a flow in the downstream direction is generated in the low flow path resistance area as well. Since the flow in the downstream side in the low flow path resistance area has small flow path resistance, it rapidly becomes a large flow to flow into the liquid flow path via the regulating portion. As a result, the above-mentioned drawing of the meniscus is quickly braked by the liquid movement in the downstream direction heading to this discharge port, whereby vibration of the meniscus can be converged at a high speed.

Further, the regulating portion is not limited to those indicated in the above-mentioned embodiments as long as it can form a state in which a component on the upstream side of a maximum bubble is substantially fixed.

[Movable Member]

Figure 3A:
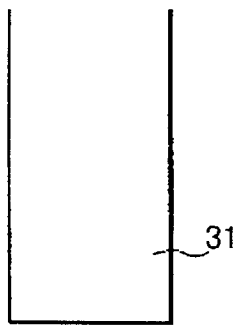
FIGS. 3A, 3B and 3C are schematic views showing various aspects of a movable member.
Figure 3B:
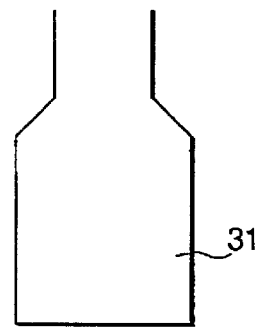
Figure 3C:
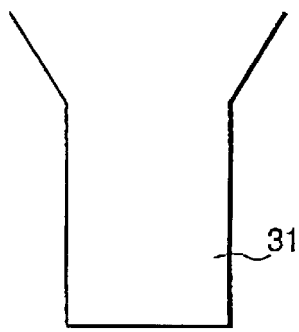

FIGS. 3A to 3C show other shapes of the movable member 31. FIG. 3A shows the movable member 31 in a rectangular shape, FIG. 3B shows the movable member 31 in a shape having a narrowed fulcrum side and making movement of a movable member easy, and FIG. 3C shows the movable member 31 in a shape having a widened fulcrum side and improving rigidity of the movable member.

The movable member 31 can be made of, for example, nickel with a thickness of 5 $\mu$m. However, the movable member 31 is not limited to this and may be made of any material as long as it has solvent resistance against discharge liquid and elasticity for operating satisfactorily as a movable member. As a material of the movable member 31, metals having high durability such as silver, nickel, gold, iron, titanium, aluminum, platinum, tantalum, stainless steel and phosphor bronze and alloys of these metals, or resin having nitrile group such as acrylonitrile, butadiene and styrene, a resin having amide group such as polyamide, a resin having carboxyl group such as polycarbonate, a resin having aldehyde group such as polyacetals, a resin having sulfone group such as polysulfone, a resin such as liquid crystal polymer and compounds of these resins; metals having high anti-ink durability such as gold, tungsten, tantalum, nickel, stainless steel and titanium and alloys of these metals, a resin having these metals or alloys coated on its surface for anti-ink durability or having amide group such as polyamide, a resin having aldehyde group such as polyacetals, a resin having ketone group such as polyether-etherketone, a resin having imide group such as polyimide, a resin having hydroxyl group such as phenol resin, a resin having ethyl group such as polyethylene, a resin having alkyl group such as polypropylene, a resin having epoxy group such as epoxy resin, a resin having amino group such as melamine resin, resin having methylol group such as xylene resin and compounds of these resins; and a ceramic such as silicon dioxide and silicon nitride and its compounds are desirable. The thickness of the movable member 31 is in the order of $\mu$m.

Arrangement relationship between a heating element and a movable member will now be described. It becomes possible to adjust and control flow of liquid at the time of bubbling by the heating element and utilize it effectively by an optimal arrangement of the heating element and the movable member.

There is a conventional art of an ink jet recording method for causing state change involving steep volume change (generation of bubbles) in ink by giving energy such as heat to the ink, discharging the ink from a discharge port by action force based on this state change and causing it to deposit on a medium to be recorded to form an image, which is a so-called bubble jet recording method. It is seen that, in this conventional art, although an area of the heating element and a discharged amount of ink are in a proportional relationship, a bubbling ineffective area S that does not contribute to ink discharge exists. In addition, it is seen from a state of burned ink (kogation) on the heating element that this bubbling ineffective area S exists around the heating element. From these results, it is considered that a part of approximately 4 µm width from the periphery of the heating element is not involved in bubbling.

Therefore, in order to effectively utilize the bubbling pressure, a part immediately above the bubbling effective area that is approximately 4 µm or more inside from the periphery of the heating element is an area effectively acting on the movable member. In the case of the present invention, it is very important that, directing attention to the dividing of a stage for causing actions of bubbles in the upstream side and the down stream side of a substantially central area of a bubble generating area (in fact, an area of approximately ±10 µm in the flowing direction of the liquid from the center) to independently act on a liquid flow inside a liquid flow path and a stage for causing the actions to act synergistically, the movable member is disposed such that only the part in the upstream side of the central area faces the movable member. Although it is assumed that the bubbling effective area is approximately 4 µm or more inside from the periphery of the heating element in this embodiment, it is not limited to this, depending on the type or the formation method of the heating element.

[Element Substrate]

Figure 4A:
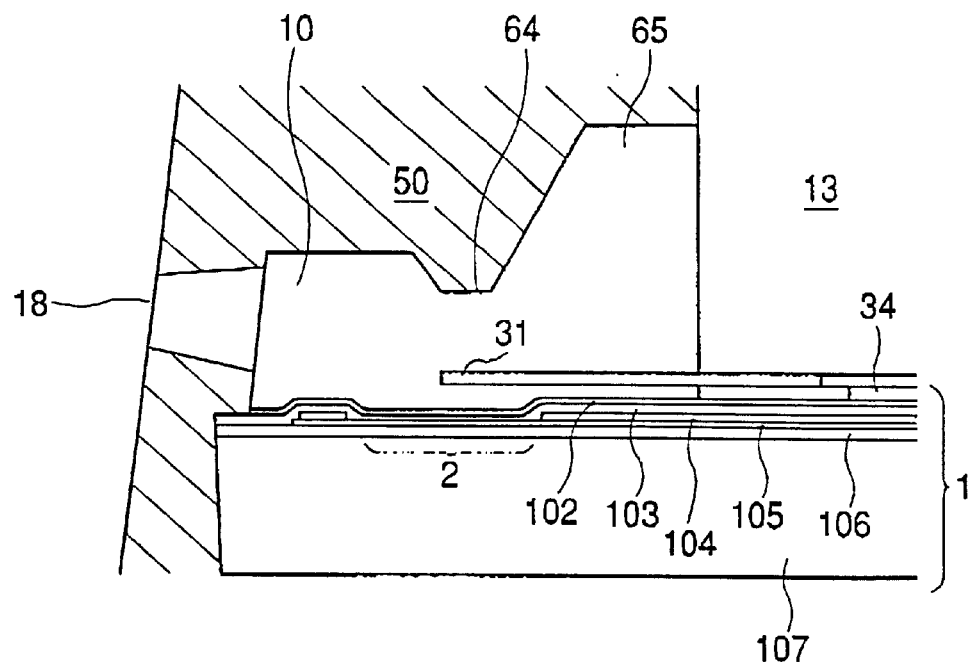
FIGS. 4A and 4B are vertical sectional views of an example of the ink jet head.
Figure 4B:
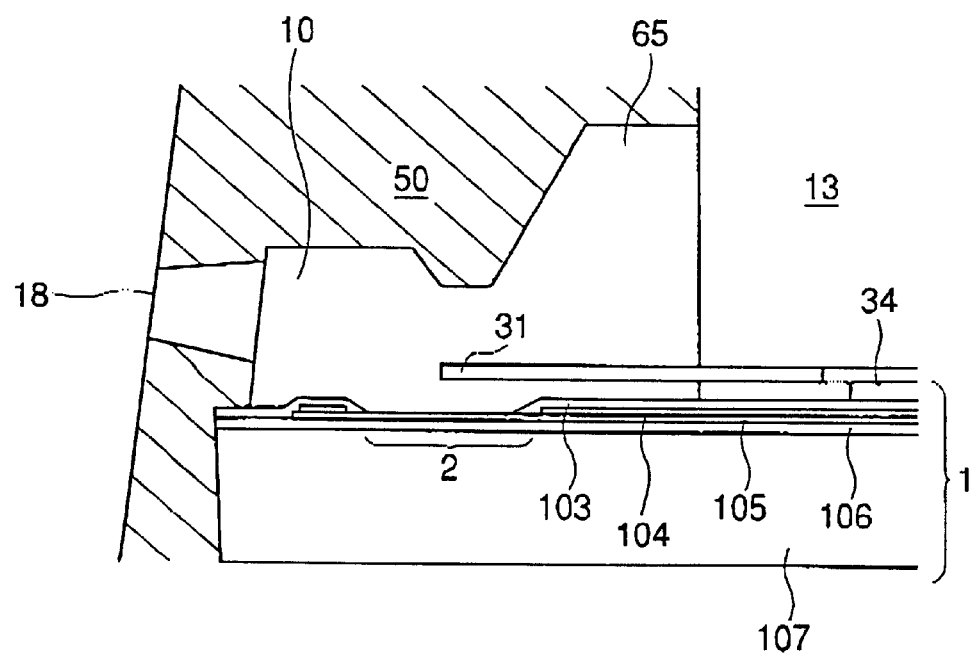

A configuration of an element substrate will now be described. FIGS. 4A and 4B show vertical sectional views of a liquid discharge head of the present invention. FIG. 4A shows the head with a protective film to be described later and FIG. 4B shows the head without the protective film. The ceiling plate 50 provided with a groove forming the liquid flow path 10, the discharge port 18 communicating to the liquid flow path 10, the low flow path resistance area 65 and the common liquid chamber 13 is disposed on the element substrate 1.

A silicon oxide film or a silicon nitride film 106 is formed for insulation and heat reservation on a substrate 107 made of silicon or the like. On the film, an electric resistive layer 105 (0.01 to 0.2 µm thickness) made of hafniumboride (HfB2), tantalum nitride (TaN), Tantalum aluminum (TaAl) or the like and wiring electrodes 104 (0.2 to 1.0 µm thickness) made of aluminum or the like are patterned as shown in FIG. 4A. A voltage is applied to the resistive layer 105 from the wiring elements 104 to flow an electric current to the resistive layer 105, whereby the resistive layer 105 is heated. A protective layer 103 made of silicon oxide, silicon nitride or the like is formed on the resistive layer between the wiring electrodes with the thickness of 0.1 to 2.0 µm, and anti-cavitation layer 102 (0.1 to 0.6 µm thickness) made of tantalum or the like is formed thereon, whereby the resistive layer 105 is protected from various liquids such as ink.

In particular, since a pressure and a shock wave, which are generated in generation of bubbles or bubble disappearance, are very strong, sharply decreasing the durability of an oxide film which is hard but easily broken, tantalum (Ta) or the like of a metal material is used as the anti-cavitation layer 102.

In addition, the element substrate may have a configuration in which the protective layer 103 is not required on the above-mentioned resistive layer 105 depending on a combination of liquid, a configuration of a liquid flow path and a resistive material. An example of this configuration is shown in FIG. 4B. As a material for such a resistive layer 105 not requiring the protective layer 103, there is an iridium-tantalum-aluminum alloy or the like.

As described above, a configuration of the heating element may include only the resistive layer (heating portion) between the electrodes or may include the protective layer for protecting the resistive layer.

[Side Shooter Type]

Figure 5A:
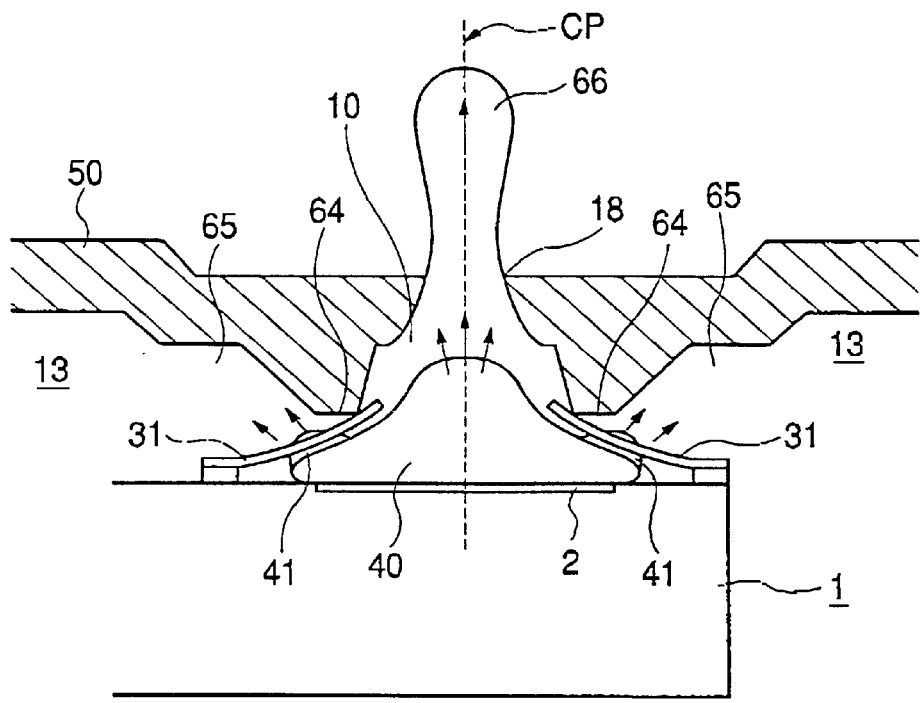
FIGS. 5A and 5B are views showing other aspects of the ink jet head.
Figure 5B:
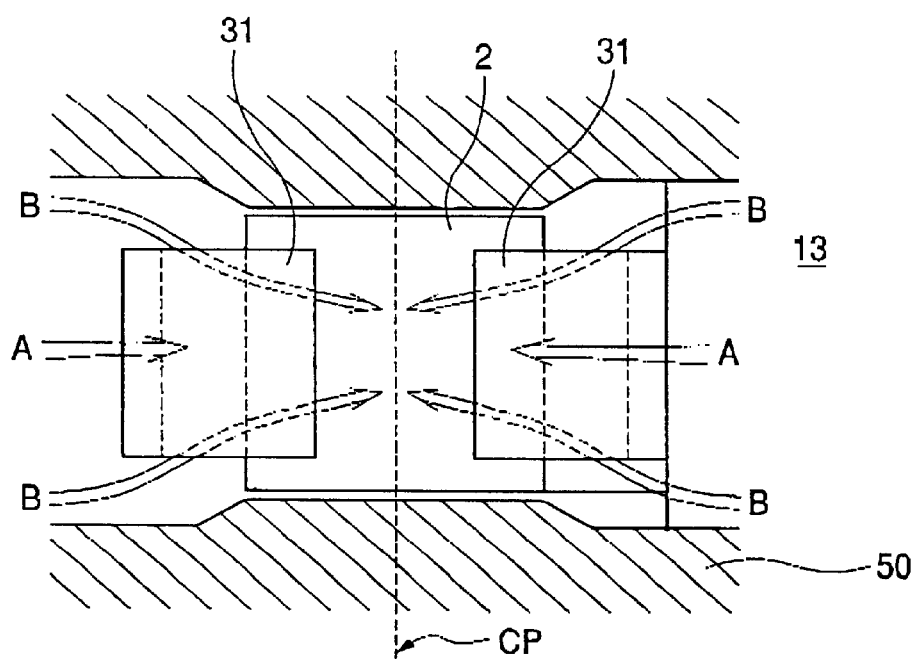

Here, a side shooter type head, in which a heating element and a discharge port face each other and to which the ink discharge principle described with reference to FIGS. 1A to 1F and FIG. 2 is applied, will be described. FIGS. 5A and 5B are views for illustrating this side shooter type head.

In FIGS. 5A and 5B, the heating element 2 on the element substrate 1 and the discharge port 18 formed in the ceiling plate 50 are arranged to oppose each other. The discharge port 18 communicates to the liquid flow path 10 passing over the heating element 2. In the vicinity area of a plane where the heating element 2 and ink contact each other, a bubble generating area exists. The two movable members 31 are supported onto the element substrate 1, each of which is formed to be plane symmetrical with respect to a plane passing through the center of the heating element. Free ends of the movable members 31 are positioned to face each other on the heating element 2. In addition, each movable member 31 has an equal area of projection to the heating element 2, and the free ends of the movable members 31 are separated with a desired dimension. Here, if it is assumed that the movable members are divided by a partition wall of a plane passing through the center of the heating element, the movable members are provided such that their free ends are positioned around the center of each part of the divided heating element. In the figure, reference symbol CP denotes a central plane.

The stoppers 64 for regulating displacement of each movable member 31 in a certain range are provided on the ceiling plate 50. In the flow from the common liquid chamber 13 to the discharge port 18, the low flow path resistance areas 65 where a flow path resistance is relatively low compared with that in the liquid flow path 10 are provided on the upstream side across the stoppers 64. A flow path structure in these areas 65 have a flow path cross section larger than that of the liquid flow path 10, whereby a resistance received from the flow path with respect to movement of ink is reduced.

Characteristic actions and effects according to the structure of this embodiment will be now described.

FIG. 5A shows a state in which a part of the ink filling the inside of the bubble generating area 11 is heated by the heating element 2 and the bubble 40 following film boiling has grown to its maximum size. At this point, the ink in the liquid flow path 10 moves in the discharge port 18 direction by a pressure based on the generation of the bubble 40, each variable member 31 is displaced by the growth of the bubble 40 and the discharged droplet 66 is about to rush out from the discharge port 18. Here, the movement of the ink in the common liquid chamber 13 direction becomes a large flow by each low flow path resistance area 65. However, since, when the two movable member 31 are displaced to a position to approach or contact the stoppers 64, further displacement is regulated, the movement of the ink in the common liquid chamber 13 direction is significantly limited there. At the same time, the growth of the bubble 40 in the upstream side is limited by the movable members 31.

However, since the moving force of the ink in the upstream direction is large, a part of the bubble 40 that is limited to grow by the movable member 31 passes through the gap between the side walls forming the liquid flow path 10 and the sides of the movable members 31 to be elevated on the upper surface sides of the movable members 31. That is, the part of the bubble forms the elevated bubble 41.

If contraction of the bubble 40 is started after such film boiling, since the force of the ink in the upstream direction is left to a great degree at this point, the movable members 31 are still into contact with the stoppers 64 and the contraction of the bubble 40 causes liquid movement from the discharge port 18 in the upstream direction in most cases. Therefore, a meniscus is largely pulled into the liquid flow path 10 from the discharge port 18 to quickly cut off the liquid column connected to the discharge liquid droplet 66 by a strong force. As a result, an amount of the liquid droplet left outside the discharge port 18, that is, a satellite is reduced.

When the bubble disappearance process is almost completed, the repulsion (restoring force) of the movable members 31 overcomes the moving force in the upstream direction of the ink in each low flow path resistance area 65, and downward displacement of the movable members 31 and the following flow in the downstream direction in the low flow path resistance areas 65 are started. At the same time, since the flow path resistance is small, the flow in the downstream direction in the low flow path resistance areas 65 rapidly becomes a large flow to flow into the liquid flow path 10 via the stoppers 64. In FIG. 5B, the liquid flow in the bubble disappearance process of the bubble 40 is denoted by reference symbols A and B. The liquid flow A indicates a component of the ink from the common liquid chamber 13 which flows through the upper surface (the other surface that does not face the heating element) sides of the movable members 31 in the discharge port 18 direction and the liquid flow B indicates a component that flows through both the sides of the movable members 31 and over the heating element 2.

As described above, the ink for discharge is supplied from the low flow path resistance areas 65, whereby the refillability is increased at a high speed. In addition, since the flow path resistance is smaller in the common liquid chamber 13 adjacent to the low flow path resistance areas 65, faster refill is made possible.

Moreover, in the bubble disappearance process of the bubble 40, the elevated bubble 41 facilitates the liquid flow from each low flow path resistance area 65 to the bubble generating area 11 to complete the bubble disappearance in conjunction with the above-mentioned fast meniscus drawing from the discharge port 18 side. In particular, bubbles are hardly accumulated in the corner of the movable members 31 or the liquid flow path 10 by the liquid flow caused by the elevated bubble 41.

[Discharge Liquid]

Among these kinds of liquid, ink of a composition used in a conventional bubble jet apparatus can be used as liquid (recording liquid) for use in recording.

In addition, liquid such as liquid with low effervescence that has been hard to discharge in the past, liquid that is easily degenerated or deteriorated by heat and liquid with high viscosity can also be used.

However, it is desired that liquid does not in nature as discharge liquid prevent discharge, bubbling, movement of a movable member, or the like of discharge liquid itself.

As discharge liquid for recording, high viscosity ink or the like can be used.

In the present invention, ink of the following compositions is further used to record an image as recording liquid that can be used as discharge liquid. Since a discharge speed of the ink is increased by the improvement of a discharge force, an accuracy of liquid droplets is improved and a very satisfactory recorded image can be realized.

As specific examples as ink, there are the following kinds of ink.

[Pigment Dispersed Liquid A]

1.58 g of anthranilic acid is added to a solution of 5 g of concentrated hydrochloric acid solved in 5.3 g of water at the temperature at 5° C. A solution of 1.78 g of sodium nitrite solved in 8.7 g of water at 5° C. is added to this under the state in which it is always maintained at 10° C. or less by being agitated in an ice bath. Moreover, after agitating for 15 minutes, 7 g of a carbon black with a surface area of 220 $m^2$/g and a DBP oil absorbing amount of 105 ml/100 g is added as it is in a mixed state. Thereafter, it is agitated further for 15 minutes. A resultant slurry is filtered by Toyo filter paper No. 2 (manufactured by Advantice), and pigment particles are sufficiently washed off and dried by an oven at 110° C. Then, water is added to this pigment to prepare a pigment solution of 10 mass % of pigment concentration.

Further, when a hydrophilic group concentration of the self-dispersing carbon black prepared as described above was measured in the following manner, it was 2.6 $\mu$mol/$m^2$. As a method of measurement, a sodium ion concentration is measured using an ion meter (manufactured by DKK), which is converted to have the hydrophilic group concentration. Then, the ion exchange method is used to replace sodium ions with ammonium ions, whereby pigment dispersed liquid A with the self-dispersing carbon black, to which surface —Ph—COONH$_4$ group is introduced, dispersed thereon is obtained.

[Pigment Dispersed Liquid B]

1.58 g of anthranilic acid is added to a solution of 5 g of concentrated hydrochloric acid solved in 5.3 g of water at the temperature at 5° C. A solution of 1.78 g of sodium nitrite solved in 8.7 g of water at 5° C. is added to this under the state in which it is always maintained at 10° C. or less by being agitated in an ice bath. Moreover, after agitating for 15 minutes, 8 g of a carbon black with a surface area of 220 $m^2$/g and a DBP oil absorbing amount of 105 ml/100 g is added as it is in a mixed state. Thereafter, it is agitated further for 15 minutes. A resultant slurry is filtered by Toyo filter paper No. 2 (manufactured by Advantice), and pigment particles are sufficiently washed off and dried by an oven at 110° C. Then, water is added to this pigment to prepare a pigment solution of 10 mass % of pigment concentration.

Further, when a hydrophilic group concentration of the self-dispersing carbon black prepared as described above was measured in the same manner as above, it was 1.6 $\mu$mol/$m^2$. Then, the ion exchange method is used to replace sodium ions with ammonium ions, whereby pigment dispersed liquid B with the self-dispersing carbon black, to which surface —Ph—COONH$_4$ group is introduced, dispersed thereon is obtained.

[Specific Example 1]

The following components are mixed, sufficiently agitated and solved, then pressurized and filtered by a microfilter of a pore size of 3.0 $\mu$m (manufactured by Fuji Film), whereby the ink of the present invention is prepared.

| | |
|---|---|
| The above-mentioned pigment dispersed liquid A | 45 parts |
| Trimethylol propane | 6 parts |
| Glycerol | 6 parts |
| Diethylene glycol | 6 parts |
| Acetylene glycol ethylene oxide adduct (Product name: Acetylenol EH) | 0.2 parts |
| Potassium hydroxide | 0.06 parts |
| Water | 36.74 parts |

[Specific Example 2]

The following components are mixed, sufficiently agitated and solved, then pressurized and filtered by a microfilter of a pore size of 3.0 μm (manufactured by Fuji Film), whereby the ink of the present invention is prepared.

| | |
|---|---|
| The above-mentioned pigment dispersed liquid A | 45 parts |
| Potassium benzoate | 1.7 parts |
| Trimethylol propane | 6 parts |
| Glycerol | 6 parts |
| Diethylene glycol | 6 parts |
| Acetylene glycol ethylene oxide adduct (Product name: Acetylenol EH) | 0.2 parts |
| Water | 35.1 parts |

[Specific Example 3]

The following components are mixed, sufficiently agitated and solved, then pressurized and filtered by a microfilter of a pore size of 3.0 μm (manufactured by Fuji Film), whereby the ink of the present invention is prepared.

| | |
|---|---|
| The above-mentioned pigment dispersed liquid B | 45 parts |
| Potassium benzoate | 1.7 parts |
| Trimethylol propane | 6 parts |
| Glycerol | 6 parts |
| Diethylene glycol | 6 parts |
| Acetylene glycol ethylene oxide adduct (Product name: Acetylenol EH) | 0.2 parts |
| Water | 35.1 parts |

[Specific Example 4]

The following components are mixed, sufficiently agitated and solved, then pressurized and filtered by a microfilter of a pore size of 3.0 μm (manufactured by Fuji Film), whereby the ink of the present invention is prepared.

| | |
|---|---|
| The above-mentioned pigment dispersed liquid A | 45 parts |
| Ammonium benzoate | 0.7 parts |
| Potassium benzoate | 0.9 parts |
| Trimethylol propane | 6 parts |
| Glycerol | 6 parts |
| Diethylene glycol | 6 parts |
| Acetylene glycol ethylene oxide adduct (Product name: Acetylenol EH) | 0.2 parts |
| Water | 35.2 parts |

[Structure of a Liquid Discharge Head]

Figure 6:
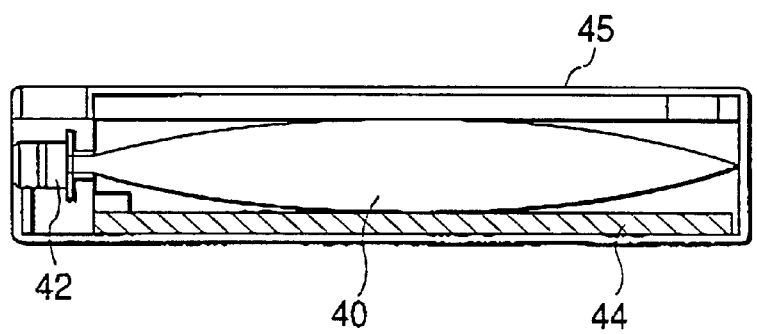
FIG. 6 is a vertical sectional view showing an example of an ink jet cartridge.

FIG. 6 shows an example of an ink cartridge 45 containing ink to be supplied to a recording head via an ink supply member, for example, a tube. Here, reference numeral 40 denotes an ink containing portion, for example, an ink bag containing ink for supply, and a plug 42 of rubber is provided at its top end. A needle (not shown) is inserted in this plug 42, whereby the ink in the ink bag 40 is available for supply to the head. Reference numeral 44 denotes an ink absorber for receiving waste ink. The ink containing portion preferably has a liquid contacting surface contacting the ink which is formed of polyolefin, in particular, polyethylene.

Figure 7:
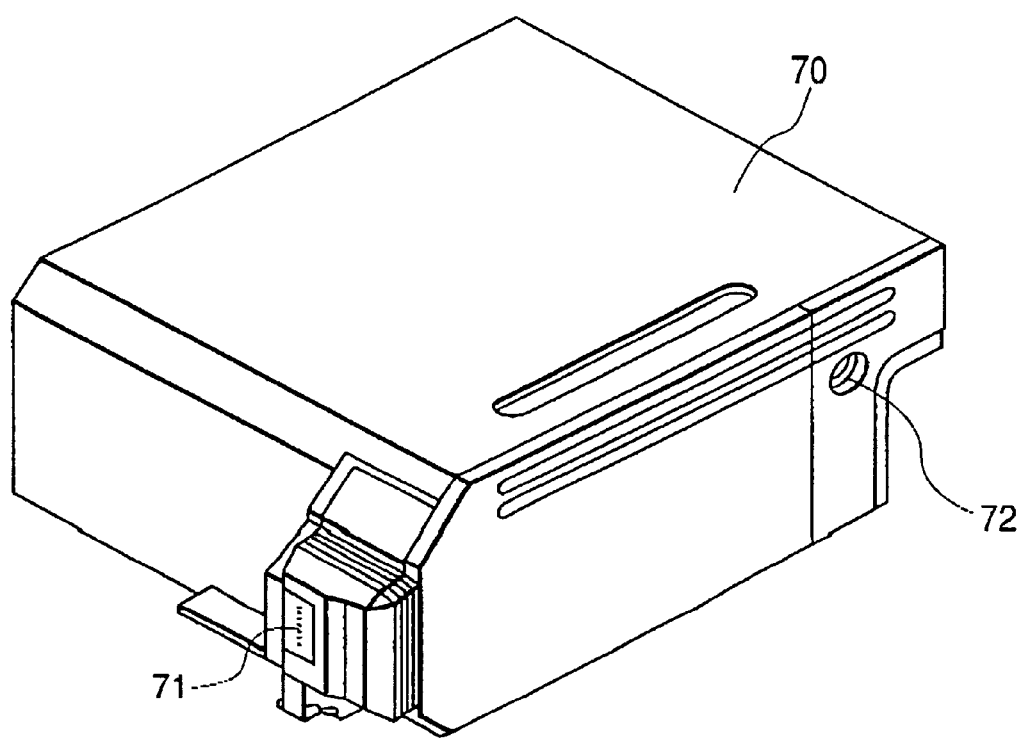
FIG. 7 is a perspective view showing an example of a recording unit.

The head part to be used in the present invention can be preferably used not only in a recording unit having the head and the ink cartridge separately as described above but also in a recording unit having them integrally. In FIG. 7, reference numeral 70 denotes a recording unit, in which an ink containing portion containing ink, for example, an ink absorber is housed. The recording unit 70 is configured such that the ink in such an ink absorber is discharged as ink droplets from a head portion 71 having a plurality of orifices. It is preferable for the present invention to use polyurethane as a material for the ink absorber.

[Liquid Disgorging Apparatus]

Figure 9:
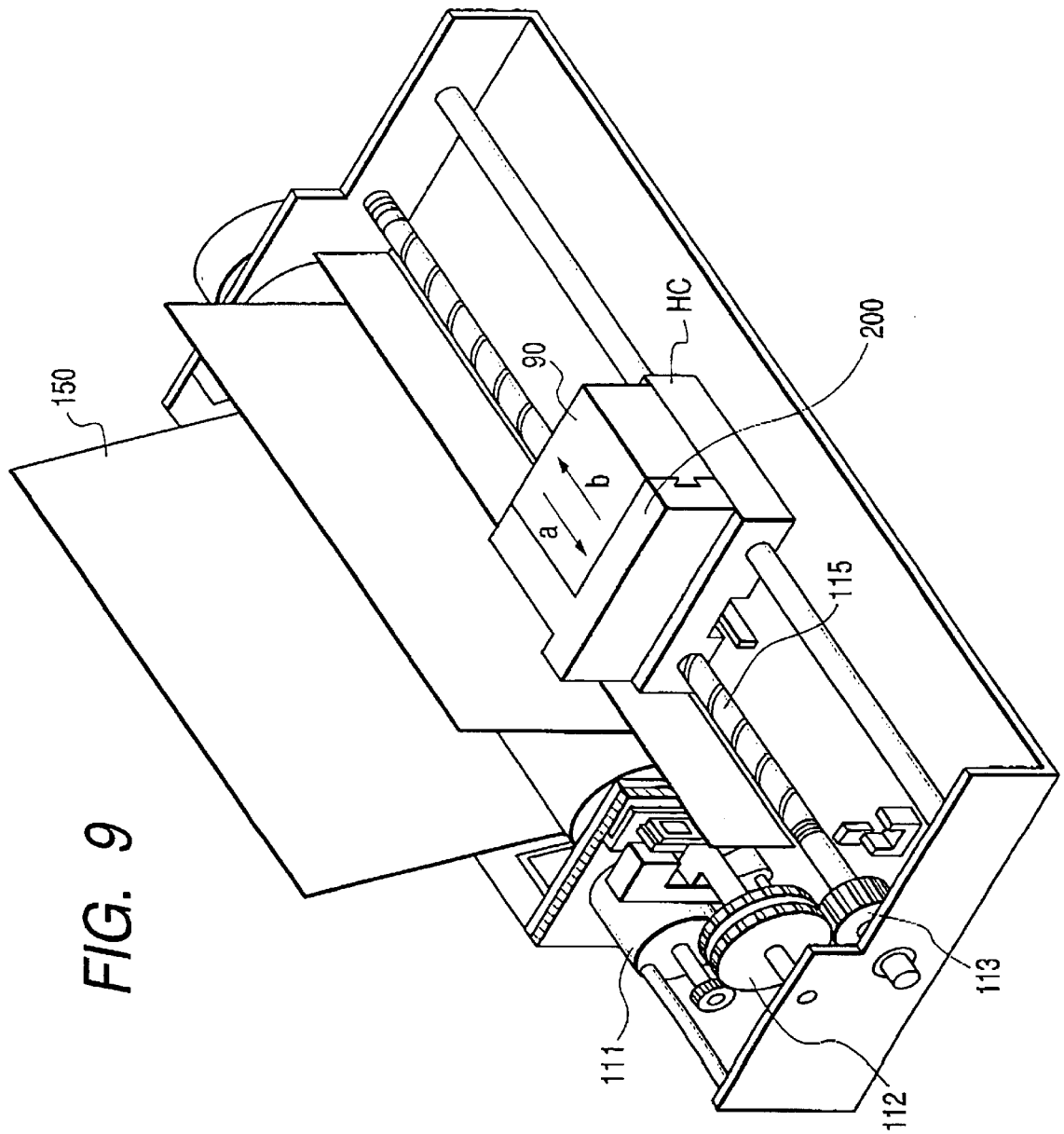
FIG. 9 is a perspective view showing a schematic configuration of a liquid discharging apparatus mounted with a liquid discharging head of the structure illustrated in FIG. 1.

FIG. 9 shows a schematic configuration of a liquid discharging apparatus to which a liquid discharge head of the structure illustrated in FIGS. 1A to 1F is mounted. In this embodiment, in particular, an ink discharge recording apparatus using ink as discharge liquid will be described. A carriage HC of the liquid discharging apparatus is mounted with head cartridge to which a liquid tank unit 90 for containing ink and a liquid discharge head unit 200 are detachably mountable. The carriage HC reciprocates in the width direction of a medium to be recorded 150 such as recording paper to be conveyed by medium to be recorded conveying means.

When a driving signal is supplied to liquid discharging means on the carriage from not-shown driving signal supplying means, recording liquid is discharged to the medium to be recorded from the liquid discharge head in response to this signal.

In addition, the liquid discharging apparatus of this embodiment has a motor 111 as a driving source for driving the medium to be recorded conveying means and the carriage, gears 112 and 113 for transmitting power from the driving source to the carriage, a carriage shaft 115 and the like. With this recording apparatus and a method of discharging liquid using this recording apparatus, a print of a satisfactory image was successfully obtained by discharging liquid to various media to be recorded.

Figure 10:
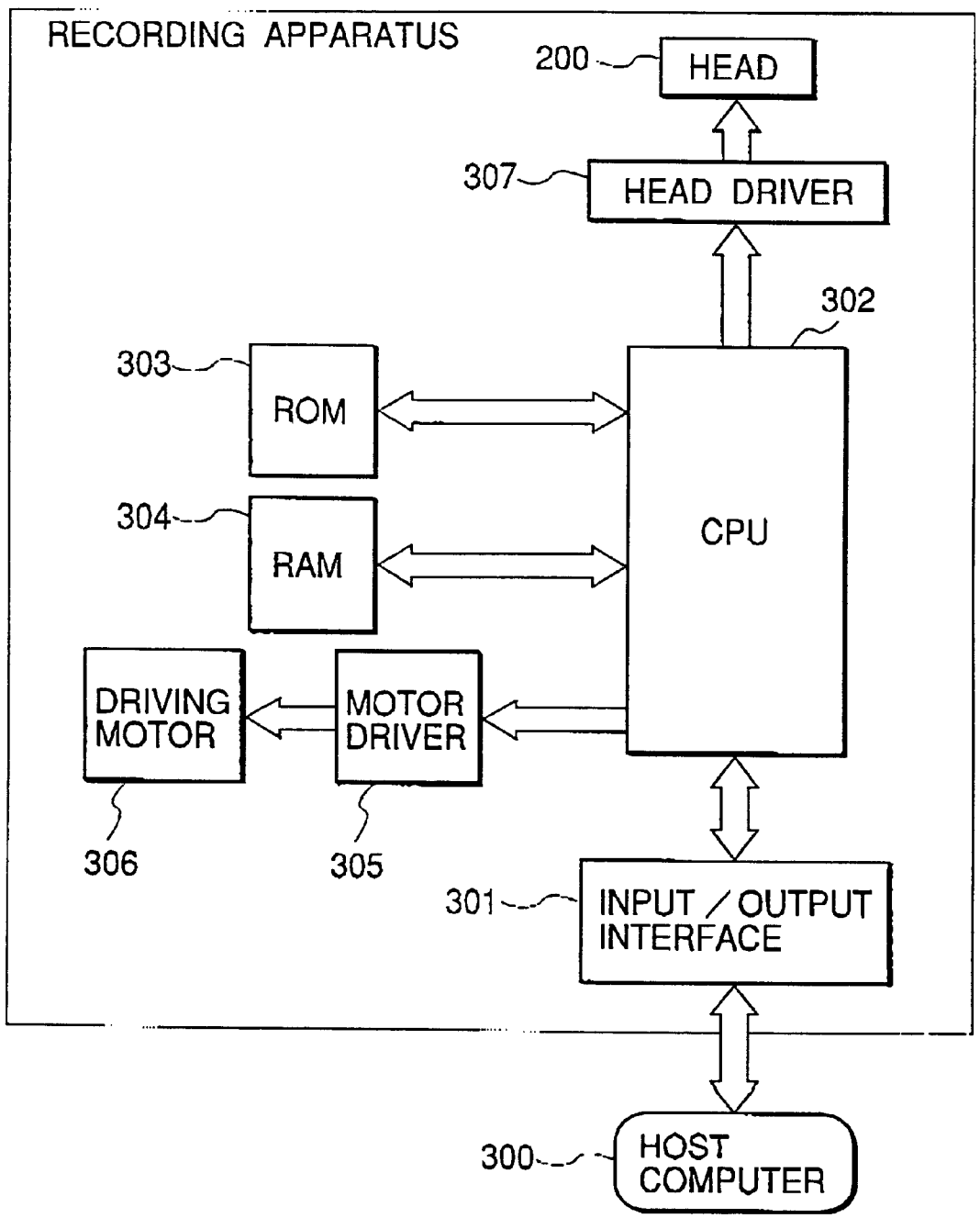
FIG. 10 is a block diagram of an entire apparatus for causing an image recording apparatus to operate.

FIG. 10 is a block diagram of an entire apparatus for causing the ink discharge recording apparatus to operate in the method of discharging liquid and the liquid discharge head of the present invention.

The recording apparatus receives printing information from a host computer 300 as a control signal. The printing information is temporarily saved in an input/output interface 301 inside the recording apparatus and, at the same time, converted to data that can be processed in the recording apparatus and inputted in a CPU 302 also functioning as head driving signal supplying means. The CPU 302 processes the data inputted in the CPU 302 using peripheral units such as a RAM 304 to convert it to data to be printed (image data) based on a control program saved in a ROM 303.

In addition, in order to record the image data in a suitable position on a recording sheet, the CPU 302 prepares driving data for driving a driving motor for moving a recording sheet and a recording head synchronously with the image data. The image data and the motor driving data are transmitted to the head 200 and a driving motor 306, respectively, via a head driver 307 and a motor driver 305 and driven at a controlled timing, respectively, to form an image.

As a medium to be recorded that can be applied to the above-mentioned recording apparatus and to which liquid such as ink is given, various kinds of paper and OHP sheets, a plastic material to be used for a compact disk, a decoration plate or the like, cloth, a metal material such as aluminum and copper, a leather material such as oxide, pig skin, artificial leather, a wood material such as wood and plywood, a bamboo material, a ceramic material such as tile, three-dimensional structure such as sponge, and the like can be used.

In addition, the above-mentioned recording apparatus includes a printer apparatus for recording an image on various kinds of paper, OHP sheets or the like, a recording apparatus for plastics for recording an image on a plastic material such as a compact disk, a recording apparatus for metals for recording an image on a metal plate, a recording apparatus for leather for recording an image on leather, a recording apparatus for wood materials for recording an image on wood, a recording apparatus for ceramics for recording an image on a ceramic material, a recording apparatus for recording an image on a three-dimensional net-like structure such as sponge, a textile printing apparatus for recording an image on cloth, and the like.

In addition, as discharge liquid to be used in these liquid discharging apparatus, it is sufficient to use liquid adapted to each medium to be recorded or a condition of recording.

As many apparently widely different embodiments of the present invention can be made without departing from the spirit and scope thereof, it is to be understood that the invention is not limited to the specific embodiments thereof except as defined in the appended claims.

What is claimed is:

1. An ink jet recording method having steps of giving energy to ink, discharging the ink from a recording head and depositing the ink on a recording medium,
    wherein said ink is ink containing a coloring material including at least self-dispersing carbon blacks, which are formed of at least one hydrophilic group bonded to a surface of a carbon black directly or via another atom group, and an aqueous medium and further having potassium ions at 0.6% or more in a mass ratio with respect to said carbon blacks, and
    said recording head includes a discharge portion for discharging liquid droplets having a heating element for generating thermal energy for generating a bubble in liquid; a discharge port that is a portion for discharging said liquid; a liquid flow path communicating to said discharge port and having a bubble generation area for generating a bubble in liquid; and a movable member that is provided facing said bubble generation area and is displaced following growth of said bubble, and said ink is supplied to said liquid flow path and discharged from said discharge port by thermal energy from said heating element.

2. An ink jet recording method according to claim 1, wherein said hydrophilic group is at least one group selected from the group consisting of —COOM, —SO$_3$M, —PO$_3$HM, and —PO$_3$M$_2$, wherein M in the formulas represents a hydrogen atom, an alkaline metal, ammonium or organic ammonium.

3. An ink jet recording method according to claim 1, wherein said potassium ions exist as a hydrophilic group counter ion of said carbon blacks.

4. An ink jet recording method according to claim 3, wherein the concentration of said hydrophilic group is 1.8 $\mu$mol/m$^2$ or more.

5. An ink jet recording method according to claim 3, wherein the total amount of monovalent cation is 0.05 mol/L or more and 1 mol/L or less.

6. An ink jet recording method according to claim 5, wherein said monovalent cation includes at least one selected from the group consisting of an alkaline metal ion, an ammonium ion and an organic ammonium ion together with a potassium ion.

7. An ink jet recording method according to claim 5, wherein the content of said monovalent cation is 0.1 mol/L or more and 0.5 mol/L or less with respect to the total amount of aqueous pigment ink.

8. An ink jet recording method according to claim 1, wherein said potassium tons are derived from potassium hydroxide.

9. An ink jet recording method according to claim 1, wherein the pH of said ink is 7 or more and 10 or less.

10. An inkjet recording method according to any one of claims 1 to 7,
    wherein said recording medium is plain paper.

11. An ink jet recording method according to claim 1, further comprising a regulating portion for regulating displacement of said movable member following the growth of said bubble,
    wherein said movable member is displaced to substantially contact said regulation part, whereby said liquid flow path is substantially divided with respect to a flowing direction of liquid heading to said discharge port.

12. An ink jet recording method according to claim 1, wherein a free end of said movable member is positioned substantially in the central part of said bubble generation area.

13. An ink jet recording method according to claim 1, wherein said recording head has a plurality of said discharge portions for discharge.

14. A recording unit provided with an ink containing portion in which ink is contained and a recording head portion for discharging said ink as ink droplets, wherein:
    said ink is ink containing a coloring material including at least self-dispersing carbon blacks, which are formed of at least one hydrophilic group bonded to a surface of a carbon black directly or via another atom group, and an aqueous medium and further having potassium ions at 0.6% or more in a mass ratio with respect to said carbon black, and
    said recording head includes a discharge portion for discharging liquid droplets having a heating element for generating thermal energy for generating a bubble in liquid; a discharge port that is a portion for discharging said liquid; a liquid flow path communicating to said discharge port and having a bubble generation area for generating a bubble in liquid; and a movable member that is provided facing said bubble generation area and is displaced following growth of said bubble.

15. A recording unit according to claim 14,
    wherein said hydrophilic group is at least one group selected from the group consisting of —COOM, —SO$_3$M, —PO$_3$HM, and —PO$_3$M$_2$, wherein M in the formulas represents a hydrogen atom, an alkaline metal, ammonium or organic ammonium.

16. A recording unit according to claim 14,
    wherein said potassium ions exist as a hydrophilic group counter ion of said carbon blacks.

17. A recording unit according to claim 16,
wherein the concentration of said hydrophilic group is 1.8 µmol/m² or more.

18. A recording unit according to claim 16,
wherein the total amount of monovalent cation is 0.05 mol/L or more and 1 mol/L or less.

19. A recording unit according to claim 18,
wherein said monovalent cation includes at least one selected from the group consisting of an alkaline metal ion, an ammonium ion and an organic ammonium ion together with a potassium ion.

20. A recording unit according to claim 18,
wherein the content of said monovalent cation is 0.1 mol/L or more and 0.5 mol/L or less with respect to the total amount of aqueous pigment ink.

21. A recording unit according to claim 14,
wherein said potassium ions are derived from potassium hydroxide.

22. A recording unit according to claim 14,
wherein the pH of said ink is 7 or more and 10 or less.

23. A recording unit according to any one of claims 14 to 20,
wherein said recording medium is plain paper.

24. A recording unit according to claim 14, further comprising a regulating portion for regulating displacement of said movable member following the growth of said bubble,
wherein said movable member is displaced to substantially contact said regulation part, whereby said liquid flow path is substantially divided with respect to a flowing direction of liquid heading to said discharge port.

25. A recording unit according to claim 14,
wherein a free end of said movable member is positioned substantially in the central part of said bubble generation area.

26. A recording unit according to claim 14,
wherein said recording head has a plurality of said discharge portions for discharge.

27. An ink jet recording apparatus provided with a recording unit having an ink containing portion in which ink is contained and a recording head portion for discharging said ink as ink droplets by an action of energy, wherein:
said ink is ink containing a coloring material including at least self-dispersing carbon blacks, which are formed of at least one hydrophilic group bonded to a surface of a carbon black directly or via another atom group, and an aqueous medium and further having potassium ions of 0.6% or more in a mass ratio with respect to said carbon black; and
said recording head includes a discharge unit for discharging liquid droplets having a heating element for generating thermal energy for generating a bubble in liquid; a discharge port that is a portion for discharging said liquid; a liquid flow path communicating to said discharge port and having a bubble generation area for generating a bubble in liquid; and a movable member that is provided facing said bubble generation area and is displaced following growth of said bubble, and said ink is supplied to said liquid flow path and discharged from said discharge port by thermal energy from said heating element.

28. An ink jet recording apparatus provided with an ink cartridge including an ink containing portion in which ink is contained and a recording head for discharging said ink as ink droplets by an action of energy, wherein:
said ink is ink containing a coloring material including at least self-dispersing carbon blacks, which are formed of at least one hydrophilic group bonded to a surface of a carbon black directly or via another atom group, and an aqueous medium and further having potassium ions at 0.6% or more in a mass ratio with respect to said carbon black; and
said recording head includes a discharge portion for discharging liquid droplets having a heating element for generating thermal energy for generating a bubble in liquid; a discharge port that is a portion for discharging said liquid; a liquid flow path communicating to said discharge port and having a bubble generation area for generating a bubble in liquid; and a movable member that is provided facing said bubble generation area and is displaced following growth of said bubble, and said ink is supplied to said liquid flow path and discharged from said discharge port by thermal energy from said heating element.

29. An ink jet recording apparatus according to claim 28, further comprising an ink supply portion for supplying said ink contained in said ink cartridge to said recording head.

30. An ink jet recording apparatus according to claim 27 or 28,
wherein said hydrophilic group is at least one group selected from the group consisting of —COOM, —SO$_3$M, —PO$_3$HM, and —PO$_3$M$_2$, wherein M in the formulas represents a hydrogen atom, an alkaline metal, ammonium or organic ammonium.

31. An ink jet recording apparatus according to claim 27 or 28,
wherein said potassium ions exist as a hydrophilic group counter ion of said carbon blacks.

32. An ink jet recording apparatus according to claim 31,
wherein the concentration of said hydrophilic group is 1.8 µmol/m² or more.

33. An ink jet recording apparatus according to claim 31,
wherein a total amount of monovalent cation is 0.05 mol/L or more and 1 mol/L or less.

34. An ink jet recording apparatus according to claim 33,
wherein said monovalent cation includes at least one selected from the group consisting of an alkaline metal ion, an ammonium ion and an organic ammonium ion together with a potassium ion.

35. An ink jet recording apparatus according to claim 33,
wherein the content of said monovalent cation is 0.1 mol/L or more and 0.5 mol/L or less with respect to the total amount of aqueous pigment ink.

36. An ink jet recording apparatus according to claim 27 or 28,
wherein said potassium ions are derived from potassium hydroxide.

37. An ink jet recording apparatus according to claim 27 or 28,
wherein the pH of said ink is 7 or more and 10 or less.

38. An ink jet recording apparatus according to claim 27 or 28, further comprising a regulating portion for regulating displacement of said movable member following the growth of said bubble,
wherein said movable member is displaced to substantially contact said regulation part, whereby said liquid flow path is substantially divided with respect to a flowing direction of liquid heading to said discharge port.

39. An ink jet recording apparatus according to claim 27 or 28, wherein a free end of said movable member is positioned substantially in the central part of said bubble generation area.

40. An ink jet recording apparatus according to claim 27 or 28,
wherein said recording head has a plurality of said discharge portions for discharge.

41. An ink jet recording method having steps of giving energy to ink, discharging the ink from a recording head and depositing said ink on a recording medium, wherein:
said ink is ink containing self-dispersing pigment having a hydrophilic group as a coloring material and containing counter ions with respect to said hydrophilic group and ions with hydration force lower than that of said hydrophilic group while being in a polarity opposite that of said hydrophilic group in addition to said counter ions; and
said recording head comprises a configuration having a heating element for generating thermal energy for generating a bubble in liquid; a discharge port that is a portion for discharging said liquid; a liquid flow path communicating to said discharge port and having a bubble generation area for generating a bubble in liquid; and a movable member that is provided facing said bubble generation area and is displaced following growth of said bubble, and said ink is supplied to said liquid flow path and discharged from said discharge port by thermal energy from said heating element.

42. A recording unit provided with an ink containing portion in which ink is contained and a recording head portion for discharging said ink as ink droplets, wherein:
said ink is ink containing self-dispersing pigment having a hydrophilic group as a coloring material and containing counter ions with respect to said hydrophilic group and also ions with hydration force lower than that of said hydrophilic group while being in a polarity opposite that of said hydrophilic group in addition to said counter ions, and
said recording head comprises an ink jet head having a heating element for generating thermal energy for generating a bubble in liquid; a discharge port that is a portion for discharging said liquid; a liquid flow path communicating to said discharge port and having a bubble generation area for generating a bubble in liquid; and a movable member that is provided facing said bubble generation area and is displaced following growth of said bubble.

43. An ink jet recording apparatus provided with a recording unit having an ink containing portion in which ink is contained and a recording head portion for discharging said ink as ink droplets by an action of energy, wherein:
said ink is ink containing self-dispersing pigment having a hydrophilic group as a coloring material and containing counter ions with respect to said hydrophilic group and also ions with hydration force lower than that of said hydrophilic group while being in a polarity opposite that of said hydrophilic group in addition to said counter ions; and
said recording head comprises an ink jet head having a heating element for generating thermal energy for generating a bubble in liquid; a discharge port that is a portion for discharging said liquid; a liquid flow path communicating to said discharge port and having a bubble generation area for generating a bubble in liquid; and a movable member that is provided facing said bubble generation area and is displaced following growth of said bubble.

44. An ink jet recording apparatus provided with an ink cartridge including an ink containing portion in which ink is contained and a recording head for discharging said ink as ink droplets by an action of energy, wherein:
said ink is ink containing self-dispersing pigment having a hydrophilic group as a coloring material and containing counter tons with respect to said hydrophilic group and ions with hydration force lower than that of said hydrophilic group while being in a polarity opposite that of said hydrophilic group in addition to said counter ions; and
said recording head has a heating element for generating thermal energy for generating a bubble in liquid; a discharge port that is a portion for discharging said liquid; a liquid flow path communicating to said discharge port and having a bubble generation area for generating a bubble in liquid; and a movable member that is provided facing said bubble generation area and is displaced following growth of said bubble.

45. An Ink jet recording apparatus according to claim 44, further comprising an ink supply portion for supplying said ink contained in said ink cartridge to said recording head.

* * * * *

UNITED STATES PATENT AND TRADEMARK OFFICE
CERTIFICATE OF CORRECTION

PATENT NO. : 6,663,237 B2
DATED : December 16, 2003
INVENTOR(S) : Hiroyuki Ishinaga et al.

It is certified that error appears in the above-identified patent and that said Letters Patent is hereby corrected as shown below:

Column 3,
Line 41, "is" should be deleted.

Column 6,
Line 42, "degree." should read -- degree --.

Column 14,
Line 31, "n-butyl" should read -- n-butyl --.

Column 23,
Line 49, "Tantalum" should read -- tantalum --.

Column 30,
Line 14, "tons" should read -- ions --.
Line 18, "inkjet" should read -- ink jet --.
Line 19, "claims 1 to 7," should read -- claims 1 to 9, --.

Column 31,
Line 22, "20," should read -- 22, --.

Column 34,
Line 29, "tons" should read -- ions --.
Line 42, "Ink" should read -- ink. --.

Signed and Sealed this

Eighth Day of June, 2004

JON W. DUDAS
*Acting Director of the United States Patent and Trademark Office*